US008797659B2

(12) United States Patent
Souma

(10) Patent No.: US 8,797,659 B2
(45) Date of Patent: Aug. 5, 2014

(54) MACRO LENS AND IMAGING APPARATUS

(71) Applicant: Yoshihito Souma, Sakai (JP)

(72) Inventor: Yoshihito Souma, Sakai (JP)

(73) Assignee: Konica Minolta Optics, Inc., Osaka (JP)

( * ) Notice: Subject to any disclaimer, the term of this patent is extended or adjusted under 35 U.S.C. 154(b) by 0 days.

(21) Appl. No.: 13/861,194

(22) Filed: Apr. 11, 2013

(65) Prior Publication Data

US 2013/0271851 A1 Oct. 17, 2013

(30) Foreign Application Priority Data

Apr. 12, 2012 (JP) ................................ 2012-090647
Jan. 28, 2013 (JP) ................................ 2013-013669

(51) Int. Cl.
*G02B 13/04* (2006.01)

(52) U.S. Cl.
USPC .......................................... 359/750; 359/749

(58) Field of Classification Search
CPC .............................. G02B 13/04; G02B 13/24
USPC ................................................ 359/749–753
See application file for complete search history.

(56) References Cited

U.S. PATENT DOCUMENTS

| 4,772,108 | A  | * | 9/1988  | Sugiyama | 359/761 |
|-----------|-----|---|---------|----------|---------|
| 6,747,817 | B2 | * | 6/2004  | Takato   | 359/794 |
| 7,715,118 | B2 |   | 5/2010  | Kato     |         |
| 2008/0247058 | A1 |  | 10/2008 | Kato     |         |
| 2009/0153980 | A1 | * | 6/2009 | Yamamoto | 359/693 |

FOREIGN PATENT DOCUMENTS

| JP | 2007-150996 | 6/2007 |
| JP | 2010-136269 | 6/2010 |
| JP | 2011-48232  | 3/2011 |
| JP | 2011-180226 | 9/2011 |
| JP | 4874852     | 2/2012 |

* cited by examiner

*Primary Examiner* — Scott J Sugarman
(74) *Attorney, Agent, or Firm* — Cozen O'Connor

(57) ABSTRACT

A macro lens and an imaging apparatus include, in the order from an object side to an image side, a first lens group, a second lens group, and a third lens group. Focusing is performed by fixing the first lens group and the third lens group, and by moving the second lens group having a positive refractive power as a whole on the optical axis in focusing from an infinite object to a close distance object. The first lens group has a plane S1 and a plane S2 of curvature radii of a same sign and satisfying a specified condition.

13 Claims, 25 Drawing Sheets

β 2Gr = 0.0184

β 2Gr = −0.8059

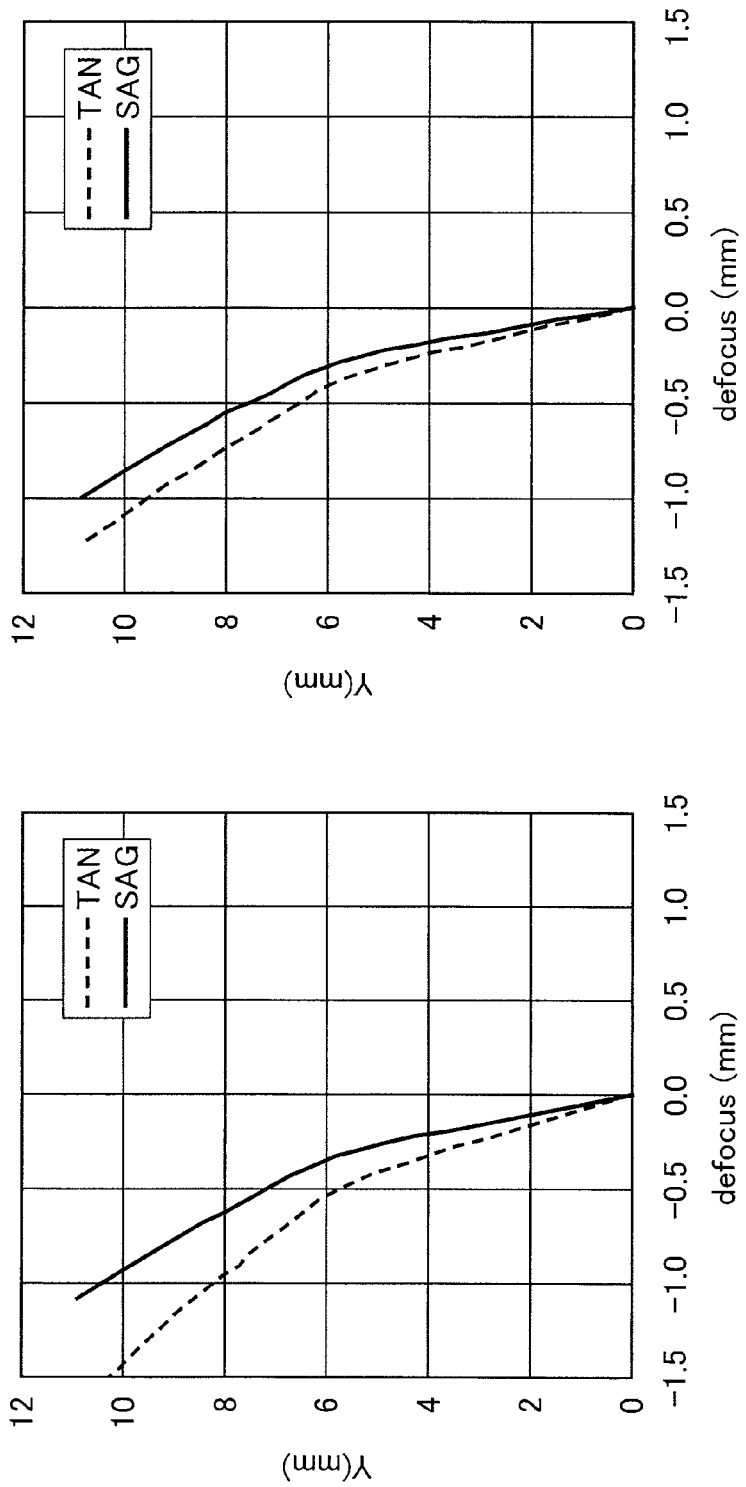

EXAMPLE 1
FIG.13A FNO=2.92    FIG.13B Y'=10.8    FIG.13C Y'=10.8
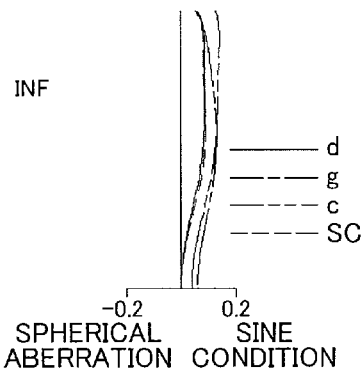
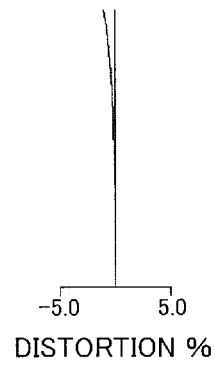
INF
— d
--- g
--- c
--- SC
---- DM
—— DS
-0.2   0.2          -0.2   0.2          -5.0   5.0
SPHERICAL  SINE    ASTIGMATISM        DISTORTION %
ABERRATION CONDITION
FIG.13D EFFECTIVE FNO=3.99   FIG.13E Y'=10.8   FIG.13F Y'=10.8
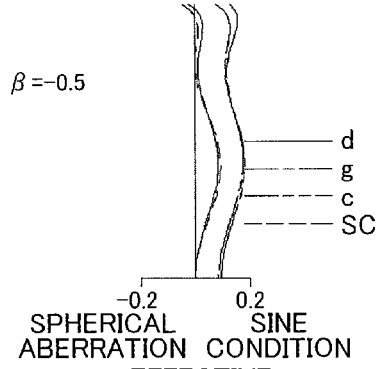
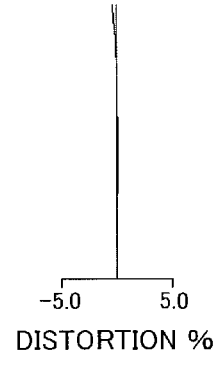
β=-0.5
— d
--- g
--- c
--- SC
---- DM
—— DS
-0.2   0.2          -0.2   0.2          -5.0   5.0
SPHERICAL  SINE    ASTIGMATISM        DISTORTION %
ABERRATION CONDITION
FIG.13G EFFECTIVE FNO=5.06   FIG.13H Y'=10.8   FIG.13I Y'=10.8
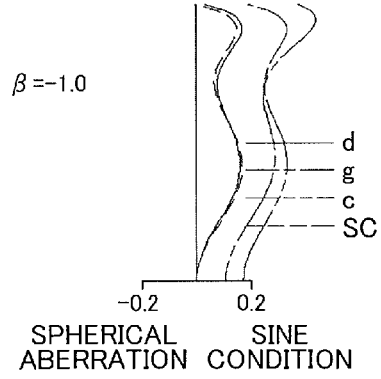
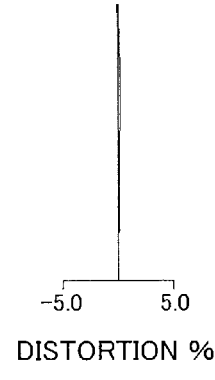
β=-1.0
— d
--- g
--- c
--- SC
---- DM
—— DS
-0.2   0.2          -0.2   0.2          -5.0   5.0
SPHERICAL  SINE    ASTIGMATISM        DISTORTION %
ABERRATION CONDITION EXAMPLE 2
FIG.18A FNO=2.92
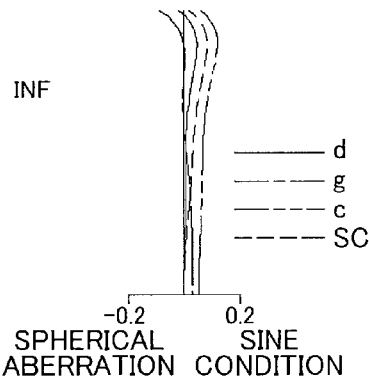
INF
SPHERICAL ABERRATION  SINE CONDITION
FIG.18B Y'=10.8  FIG.18C Y'=10.8
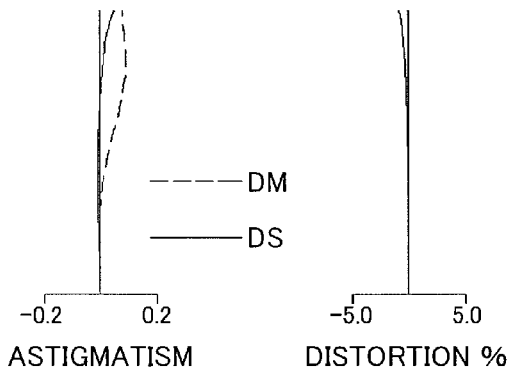
ASTIGMATISM     DISTORTION %
FIG.18D EFFECTIVE FNO=4.06
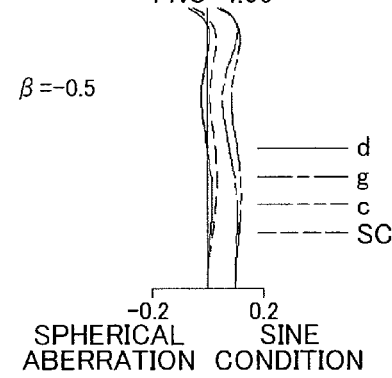
β=-0.5
SPHERICAL ABERRATION  SINE CONDITION
FIG.18E Y'=10.8  FIG.18F Y'=10.8
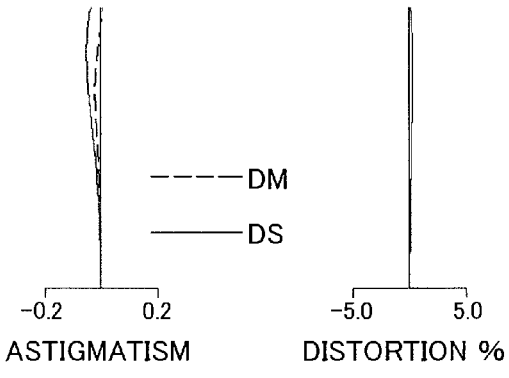
ASTIGMATISM     DISTORTION %
FIG.18G EFFECTIVE FNO=5.15
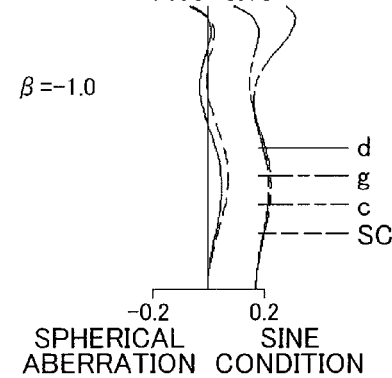
β=-1.0
SPHERICAL ABERRATION  SINE CONDITION
FIG.18H Y'=10.8  FIG.18I Y'=10.8
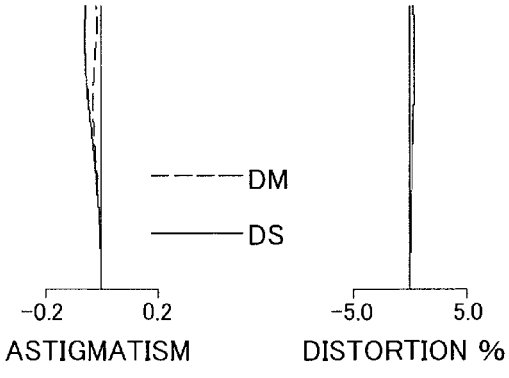
ASTIGMATISM     DISTORTION %

EXAMPLE 3
FIG.23A FNO=2.92
INF
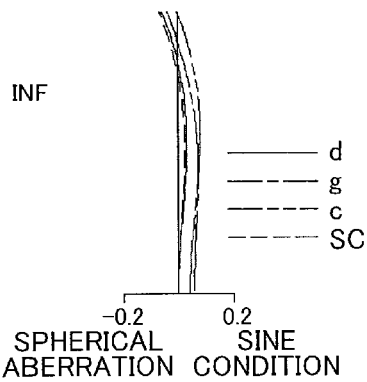
-0.2  0.2
SPHERICAL  SINE
ABERRATION CONDITION
— d
--- g
-·- c
-·-· SC
FIG.23B Y'=10.8
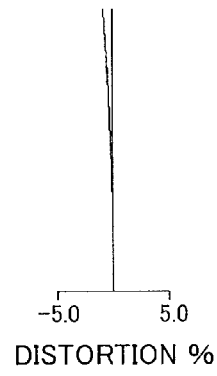
-0.2  0.2
ASTIGMATISM
---- DM
—— DS
FIG.23C Y'=10.8
-5.0  5.0
DISTORTION %
FIG.23D EFFECTIVE FNO=3.97
β=-0.5
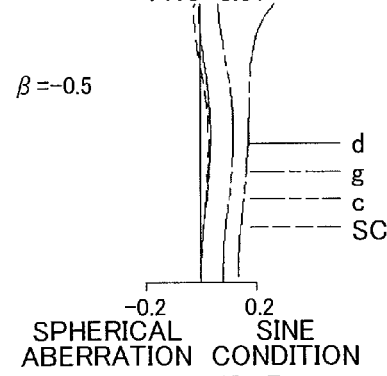
-0.2  0.2
SPHERICAL  SINE
ABERRATION CONDITION
— d
--- g
-·- c
-·-· SC
FIG.23E Y'=10.8
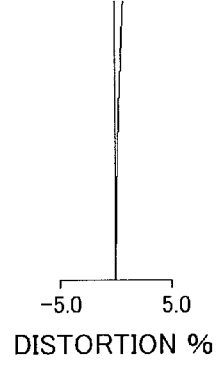
-0.2  0.2
ASTIGMATISM
---- DM
—— DS
FIG.23F Y'=10.8
-5.0  5.0
DISTORTION %
FIG.23G EFFECTIVE FNO=4.97
β=-1.0
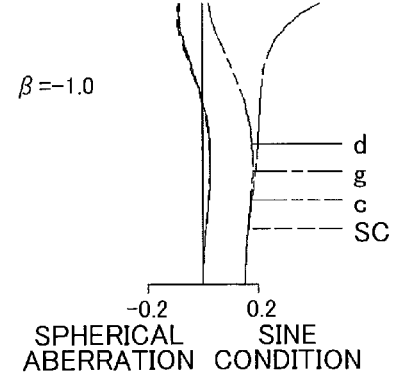
-0.2  0.2
SPHERICAL  SINE
ABERRATION CONDITION
— d
--- g
-·- c
-·-· SC
FIG.23H Y'=10.8
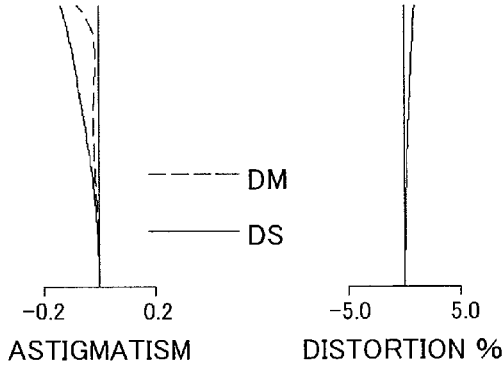
-0.2  0.2
ASTIGMATISM
---- DM
—— DS
FIG.23I Y'=10.8
-5.0  5.0
DISTORTION %

EXAMPLE 4
FIG.24A FNO=2.92
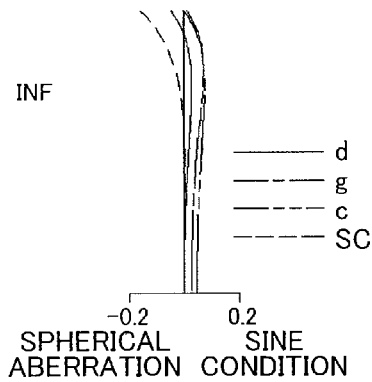
INF
SPHERICAL ABERRATION / SINE CONDITION
FIG.24B Y'=10.8
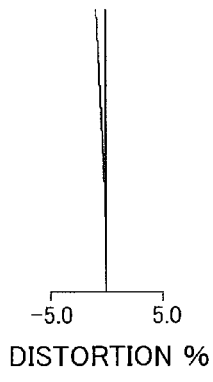
ASTIGMATISM
FIG.24C Y'=10.8
DISTORTION %
FIG.24D EFFECTIVE FNO=4.29
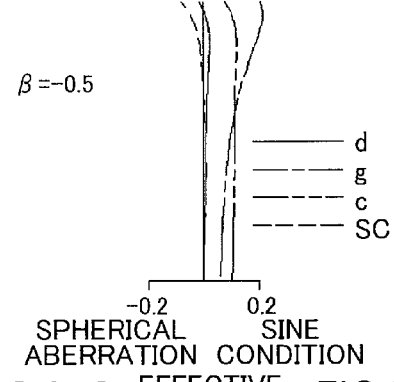
β=-0.5
SPHERICAL ABERRATION / SINE CONDITION
FIG.24E Y'=10.8
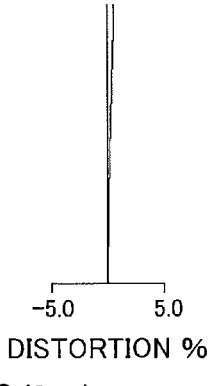
ASTIGMATISM
FIG.24F Y'=10.8
DISTORTION %
FIG.24G EFFECTIVE FNO=5.68
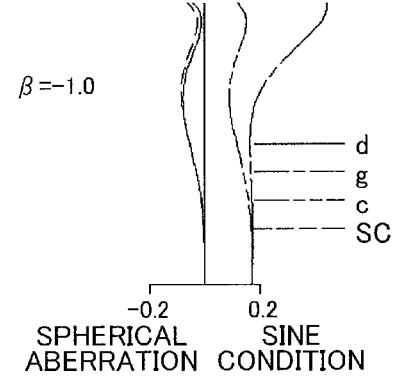
β=-1.0
SPHERICAL ABERRATION / SINE CONDITION
FIG.24H Y'=10.8
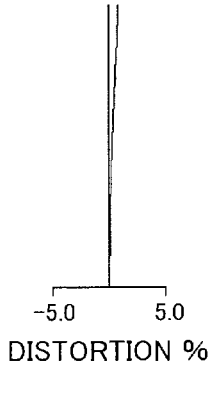
ASTIGMATISM
FIG.24I Y'=10.8
DISTORTION %

EXAMPLE 4
y'=7.6 y'=0

EXAMPLE 4
y'=7.6 y'=0 y'=7.6

EXAMPLE 5
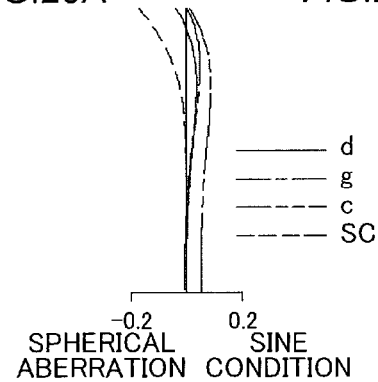
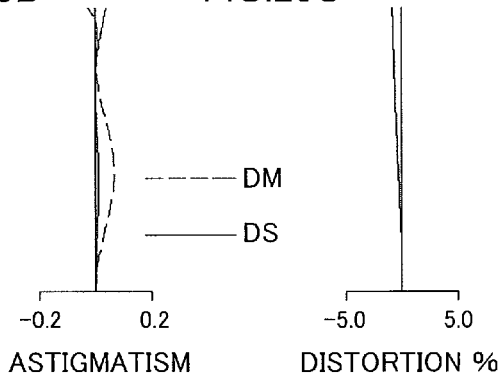
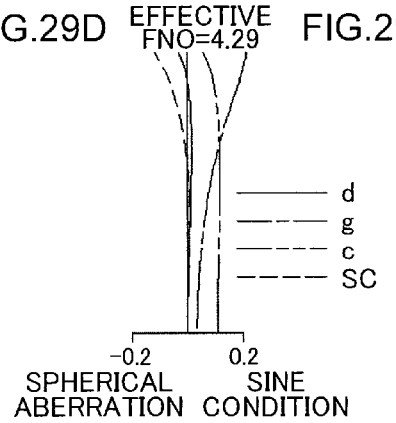
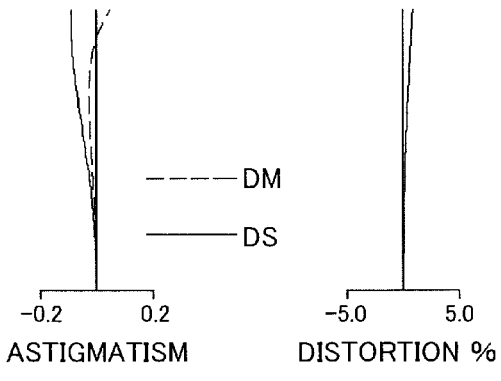
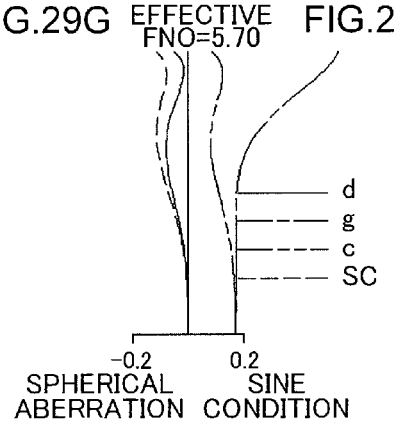
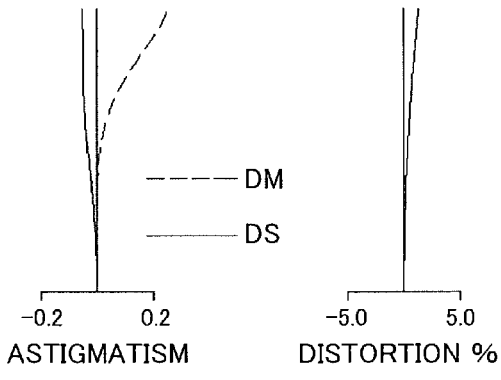

MACRO LENS AND IMAGING APPARATUS

BACKGROUND OF THE INVENTION

1. Field of the Invention

The present invention relates to a macro lens, and more particularly to an in-focus macro lens, and an imaging apparatus incorporated with the macro lens.

2. Description of the Background Art

A macro lens is a lens capable of close-up photography at a photographing magnification such as the same size. It is an ordinary practice that a macro lens is used for photographing objects in a wide range from an infinite object to a close distance object. In view of the above, it is required to correct aberrations in a satisfactory manner in the wide range for focusing. In recent years, as disclosed in e.g. Japanese Unexamined Patent Publication No. 2011-180226 (patent literature 1), a so-called floating system of moving plural lens groups for focusing is mainly employed. On the other hand, there is also proposed a method in which only one lens group is moved in focusing, as disclosed in Japanese Patent No. 4,874,852 (corresponding to Japanese Unexamined Patent Publication No. 2008-257088, patent literature 2), without employing the floating system for focusing.

Further, in recent years, in the field of cameras (imaging apparatuses), digital cameras have been generally used, in place of silver-halide cameras. Furthermore, moving image photographing can be performed, in addition to still image photographing by auto focusing. In the moving image photographing, in order to keep an in-focus state with respect to movement of an object, control of wobbling a focusing lens group at a high speed for moving the focusing lens group in such a manner as to constantly obtain a maximum value of contrast is performed. Japanese Unexamined Patent Publication No. 2011-048232 (patent literature 3) discloses a macro lens, as an example of macro lenses suitable for such a control.

In the case where a floating system is employed as disclosed in patent literature 1 and in patent literature 3, it is possible to reduce the aberration variation in the range from an infinite distance to a closest distance to a relatively small value. However, in the floating system, it is necessary to move plural lens groups. This may complicate the mechanism, and may increase production error such as backlash or play in a movable lens group. Thus, sufficient stability may not be obtained.

In patent literature 2, a lens group to be moved in focusing is only one among the plural lens groups. Accordingly, the above problem relating to stability may be suppressed. However, in order to obtain stable imaging performance (satisfactory aberration correction) in the range from an infinite distance to a closest distance, it is necessary to sufficiently suppress various aberrations by the lens group to be moved in focusing. This may increase the number of lens elements constituting the lens group to be moved in focusing, and may obstruct high-speed focusing as disclosed in patent literature 3.

Further, in the moving image photographing, it is an ordinary practice to record sounds simultaneously with recording images. In view of the above, it is required to suppress noise such as operating noise generated in a camera or in a macro lens as much as possible. Generally, noise generated in a macro lens is operating noise of an actuator to be used in a focusing operation (wobbling operation). It is necessary to provide a countermeasure against operating noise of an actuator. It is important to reduce the load of an actuator by reducing operating noise of the actuator, as a countermeasure against noise. Thus, in this aspect also, it is required to reduce the weight of a lens group to be moved in focusing.

SUMMARY OF THE INVENTION

In view of the above, an object of the invention is to provide a macro lens that enables to increase the moving speed of a lens group to be moved in focusing and reduce the weight of the lens group, while suppressing aberration variation in the range from an infinite distance to a closest distance. Another object of the invention is to provide an imaging apparatus incorporated with the macro lens.

To achieve at least one of the above mentioned objects, a macro lens and an imaging apparatus reflecting one aspect of the invention include, in the order from an object side to an image side, a first lens group, a second lens group, and a third lens group. Focusing is performed by fixing the first lens group and the third lens group, and by moving the second lens group having a positive refractive power as a whole on the optical axis in focusing from an infinite object to a close distance object. The first lens group includes a plane S1 and a plane S2 having curvature radii of a same sign and satisfying a specified condition.

BRIEF DESCRIPTION OF THE DRAWINGS

FIGS. 5A and 5B are diagrams showing astigmatism generated in the second lens group of the macro lens, in the case where focusing is performed from an infinite object to a closest distance object;

FIGS. 13A through 13I are longitudinal aberration diagrams of the macro lens as Example 1;

FIGS. 18A through 18I are longitudinal aberration diagrams of the macro lens as Example 2;

FIGS. 23A through 23I are longitudinal aberration diagrams of the macro lens as Example 3;

FIGS. 24A through 24I are longitudinal aberration diagrams of the macro lens as Example 4;

FIGS. 29A through 29I are longitudinal aberration diagrams of the macro lens as Example 5;

DETAILED DESCRIPTION OF THE PREFERRED EMBODIMENTS

Figure 1:
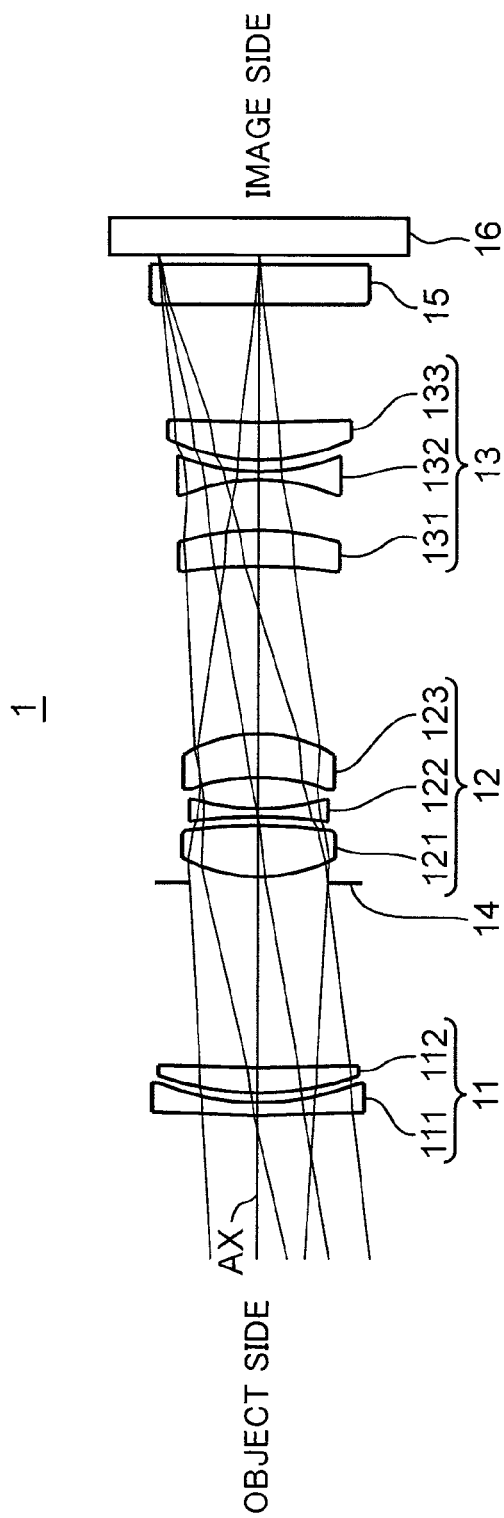
FIG. 1 is a lens sectional view for schematically describing the basic idea about a macro lens embodying the invention.

Hereinafter, an embodiment of the invention is described referring to the drawings. Constructions identified by the same reference numerals in the drawings are the same constructions and not repeatedly described unless necessary. The number of lenses in a cemented lens is represented by the number of lens elements composing the cemented lens.

<Description on Terms>

The terms used in the following description are defined as follows in this specification.

(a) A refractive index is the one for a wavelength (587.56 nm) of a d-line.

(b) An Abbe number is an Abbe number vd obtained by the following definitional equation:

$$vd=(nd-1)/(nF-nC)$$

where nd: a refractive index for the d-line, nF: a refractive index for an F-line (wavelength: 486.13 nm), nC: a refractive index for a C-line (wavelength: 656.28 nm), and vd: an Abbe number.

(c) Expressions such as "concave", "convex" and "meniscus" used to describe lens elements indicate the lens shapes near an optical axis (near the center of a lens element).

(d) A refractive power (an optical power, an inverse of a focal length) of each of the lens elements composing a cemented lens is a power in the case where there is air at the opposite sides of lens surfaces of each lens element.

(e) Since a resin material used for a hybrid aspherical lens has only an additional function of a glass material for a substrate, the hybrid aspherical lens is not handled as a single optical member, but handled similar to the case where the substrate composed of the glass material has an aspherical surface, and is considered to be one lens element. A lens refractive index is also considered to be a refractive index of a glass material forming a substrate. A hybrid aspherical lens is a lens formed to have an aspherical surface by applying a thin layer of a resin material on a glass material forming a substrate.

<Description on Basic Idea of Inventive Macro Lens>

Figure 2:
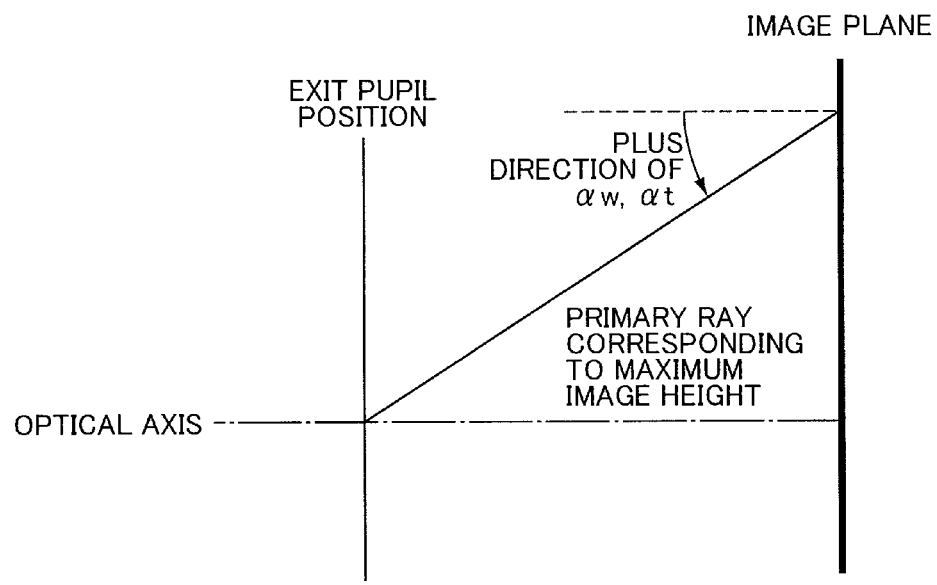
FIG. 2 is a schematic diagram showing the definition of an incident angle of a principal ray on an image plane.
Figure 3B:
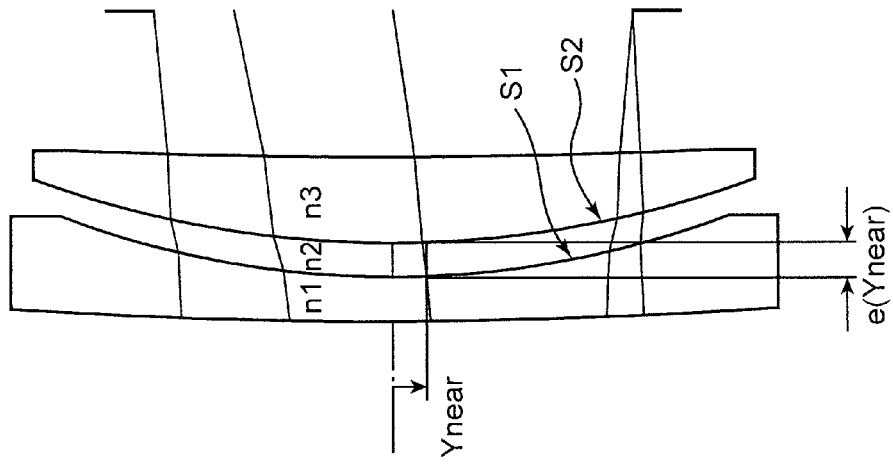
FIGS. 3A and 3B are diagrams for describing various parameters of the macro lens.
Figure 3A:
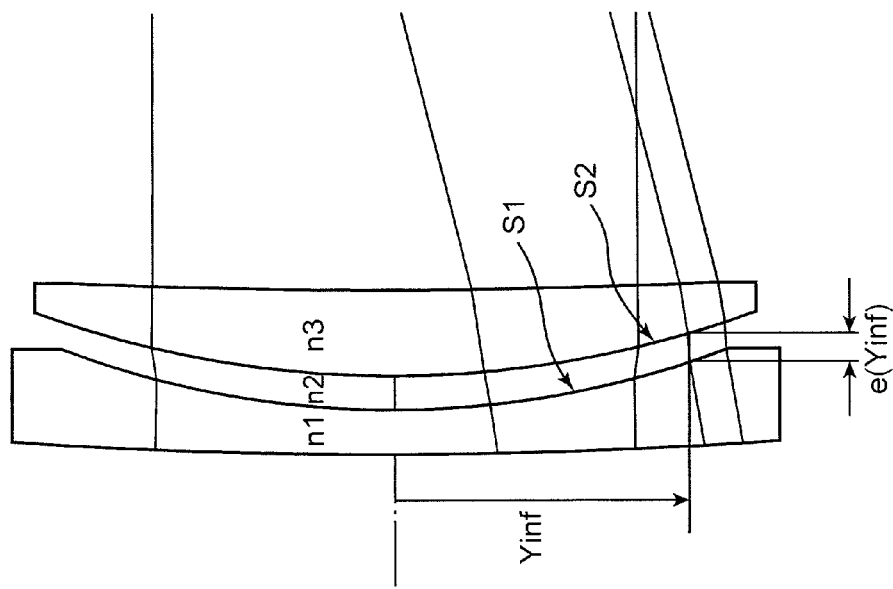

FIG. 1 is a lens sectional view for schematically describing the basic idea of a macro lens embodying the invention. FIG. 2 is a schematic diagram showing the definition of an incident angle of a principal ray on an image plane. In the following, as shown in FIG. 2, the incident angle of the principal ray on the image plane is the angle α (unit: degree) of the principal ray incident at a maximum angle of view, out of incident light rays onto an image plane, with respect to normal to the image plane; and the incident angle α with respect to the image plane is defined based on the premise that the principal ray angle is in the plus direction in the case where the exit pupil position is located on the object side with respect to the image plane. FIGS. 3A and 3B are diagrams for describing various parameters n1, n2, n3, Yinf, e(Yinf), Ynear, and e(Ynear) of the macro lens 1. FIG. 3A shows a case, in which an infinite object is focused, and FIG. 3B shows a case, in which a closest distance object is focused.

Referring to FIG. 1, the macro lens 1 for describing the above basic idea forms an optical image of an object (subject) on a light receiving surface of an imaging element 16 for converting the optical image into an electrical signal. The macro lens 1 is an optical system constituted of, in the order from the object side to the image side, a first lens group 11, a second lens group 12, and a third lens group 13, each of which is provided with one or more lens elements. The imaging element 16 is disposed at such a position that the light receiving surface thereof substantially coincides with the image plane of the macro lens 1. In other words, the image plane of the macro lens 1 corresponds to the imaging surface of the imaging element 16. The macro lens 1 exemplarily illustrated in FIG. 1 has the same construction as a macro lens 1A (see FIGS. 8A through 8C) as Example 1 to be described later.

In the macro lens 1, the first lens group 11 and the third lens group 13 are fixed, and the second lens group 12 is moved in focusing. Focusing is performed by moving only the second lens group 12 in the optical axis AX direction. The macro lens 1 is a so-called inner focus lens. Further, since the first lens group 11 and the third lens group 13 in contact with the outside are fixed, it is easy to prevent intrusion of dust or moisture from the outside, which is preferable.

Further, the first lens group 11 has a positive refractive power as a whole, the second lens group 12 has a positive refractive power as a whole, and the third lens group 13 has a negative refractive power as a whole. The first lens group 11 has a plane S1 and a plane S2 having curvature radii of a same sign, and defined by the following conditional expressions (1) through (3).

$$0.6 < M2/f2 < 1 \quad (1)$$

$$(\phi inf - \phi near)/f2 < -0.0002 \quad (2)$$

$$e0/f2 < 0.15 \quad (3)$$

where M2 is a moving amount of the second lens group 12 in the range from an infinite distance to a closest distance, f2 is a focal length of the second lens group 12, and e0 is an air equivalent distance between the plane S1 and the plane S2 on the optical axis. Referring to FIG. 3A, the symbol φinf represents a combined optical power of the plane S1 and the plane S2 in a direction parallel to the optical axis AX, and is an optical power to be defined by the following conditional expression (4A), assuming that Yinf is a height of a light ray of a light flux from the optical axis AX, based on the premise that the light ray passes the center of an aperture stop and intersects the plane S1, and the light flux forms an image having a maximum image height at the time of forming an infinite object.

$$\phi inf = (\phi 1(Yinf) + \phi 2(Yinf) - \phi 1(Yinf)\phi 2(Yinf)e(Yinf))/n3 \quad (4A)$$

In the embodiment, assuming that n1 is a refractive index of an object-side medium of the plane S1 for a d-line, n2 is a refractive index of a medium between the plane S1 and the plane S2 for the d-line, n3 is a refractive index of the image-side medium of the plane S2 for the d-line, C1(Y) is a curvature of the plane S1 at a height Y, C2(Y) is a curvature of the plane S2 at the height Y, and e(Y) is an air equivalent distance (air equivalent plane interval) (see FIGS. 3A and 3B) between the plane S1 and the plane S2 in the direction parallel to the optical axis AX with respect to the height Y, φ1(Y) is an optical power of the plane S1 at the height Y from the optical axis AX, and is an optical power to be defined by the following conditional expression (5), and φ2(Y) is an optical power of the plane S2 at the height Y from the optical axis AX, and is an optical power to be defined by the following conditional expression (6).

$$\phi 1(Y) = (n2 - n1)C1(Y) \quad (5)$$

$$\phi 2(Y) = (n3 - n2)C2(Y) \quad (6)$$

Further, referring to FIG. 3B, φnear is a combined optical power of the plane S1 and the plane S2 in a direction parallel to the optical axis AX, and is an optical power to be defined by the following conditional expression (4B), assuming that Ynear is a height of a light ray of a light flux from the optical axis AX, based on the premise that the light ray passes the center of an aperture stop and intersects the plane S1, and the light flux forms an image having a maximum image height at the time of forming a closest distance object.

$$\phi near = (\phi 1(Ynear) + \phi 2(Ynear) - \phi 1(Ynear)\phi 2(Ynear)e(Ynear))/n3 \quad (4B)$$

More specifically, in the example shown in FIG. 1, the first lens group 11 is provided with a negative meniscus lens element 111 and a positive meniscus lens element 112. The second lens group 12 is provided with a biconvex positive lens element 121, a biconcave negative lens element 122, and a positive meniscus lens element 123. An optical diaphragm 14 is disposed on the object side of the second lens group 12, specifically, on the object side of the positive lens element 121, which is disposed at a position closest to the object side in the second lens group 12. The optical diaphragm 14 is integrally moved with the second lens group 12. The optical diaphragm 14 is preferably an aperture stop. The third lens group 13 is provided with a positive meniscus lens element 131, a biconcave negative lens element 132, and a positive meniscus lens element 133. Both surfaces of the positive meniscus lens element 123 in the second lens group 12 are aspherical.

The lens elements 111, 112, 121 through 123, and 131 through 133 of the first through third lens groups 11 through 13 may be glass molded lens elements, or may be resin lens elements made of plastic. A resin lens element is preferable in the aspect of reducing the weight, mass production, and cost reduction.

In the case where a glass lens element having an aspherical surface is used, the aspherical glass lens element may be a glass molded aspherical lens element, a ground aspherical glass lens element, or a hybrid aspherical lens element (a lens element obtained by forming an aspherical resin layer on a spherical glass lens element). The glass molded aspherical lens element is preferable for mass production. The hybrid aspherical lens element has a high degree of freedom in design, because many kinds of glass materials capable of molding into a substrate are available. In particular, it is preferable to use a hybrid aspherical lens element, in view of a point that it is not easy to mold a material having a high refractive index into an aspherical lens element. Further, forming one surface of a lens element into an aspherical surface is advantageous in maximally utilizing the advantages of the hybrid aspherical lens element.

A filter 15 and the imaging element 16 are disposed on the image side of the macro lens 1, specifically, on the image side of the third lens group 13. The filter 15 is an optical element in the form of a parallel plate, and is a schematic example of various optical filters, or a cover glass (seal glass) for the imaging element 16. It is possible to dispose various optical filters such as an optical low-pass filter or an infrared cut filter, as necessary, depending on the purpose of use or the configuration of an imaging element or a camera. The imaging element 16 is an element for photoelectrically converting an optical image of an object formed by the macro lens 1 into image signals of respective color components of R (red), G (green) and B (blue) in accordance with the light amount of the optical image, and for outputting the image signals to a specified image processing circuit (not shown). Thus, the optical image of the object on the object side is introduced to the light receiving surface of the imaging element 16 at a suitable magnification along the optical axis AX by the macro lens 1, whereby the optical image of the object is imaged by the imaging element 16.

The thus-configured macro lens 1 satisfies the aforementioned conditional expressions (1) through (3); and the first lens group 11 and the third lens group 13 are fixed with respect to the image plane, and the second lens group 12 is largely moved toward the object side in focusing. In the macro lens having the above configuration, it is possible to greatly change the height of an off-axis light ray in the first lens group 11 in the range from an infinite distance to a closest distance. The second lens group 12 is largely moved toward the object side in focusing. As a result, astigmatism in the second lens group 12 may greatly change. However, as described above, since the height of an off-axis light ray in the first lens group 11 is greatly changed in focusing, it is possible to cancel out the astigmatism that may be greatly changed in the second lens group 12 by the first lens group 11. Thus, the macro lens 1, in which a lens group to be moved in focusing is only one among the plural lens groups, is advantageous in increasing the moving speed of the lens group to be moved in focusing and reducing the weight of the lens group, while suppressing aberration variation in the range from an infinite distance to a closest distance.

Figure 4A:
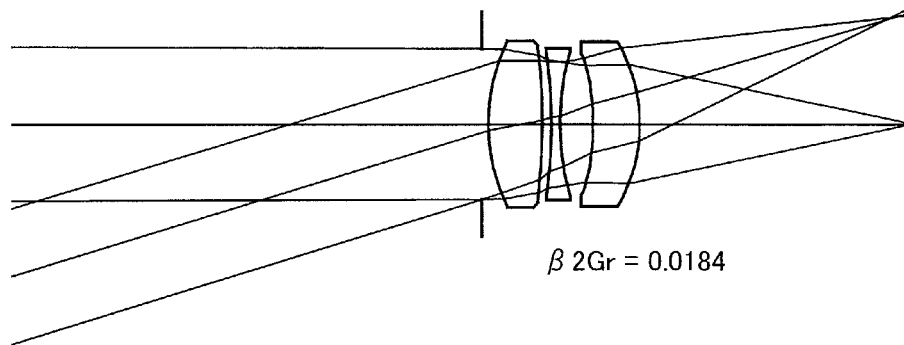
FIGS. 4A and 4B are diagrams for describing how astigmatism is generated in a second lens group of the macro lens, in the case where focusing is performed from an infinite object to a closest distance object.
Figure 4B:
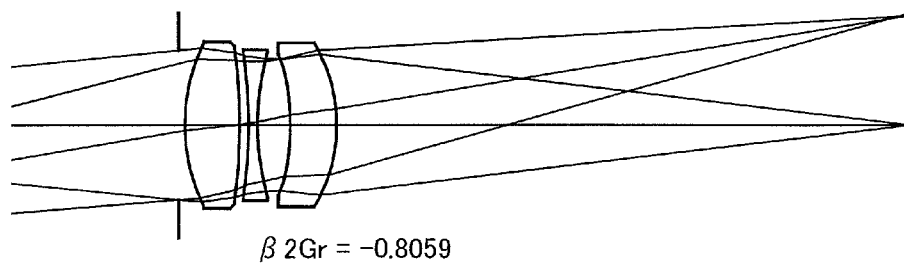

FIGS. 4A and 4B are diagrams for describing how astigmatism is generated by a second lens group in focusing from an infinite object to a closest distance object. FIG. 4A shows a case, in which an infinite object is focused, and FIG. 4B shows a case, in which a closest object is focused. FIGS. 5A and 5B are diagrams showing astigmatism of the second lens group in focusing from an infinite object to a closest distance object. FIG. 5A shows a case of an infinite distance, and FIG. 5B shows a case of a closest distance. Referring to FIGS. 5A and 5B, a horizontal axis represents a focus position deviation in mm, a vertical axis thereof represents an image height Y in mm, the broken line represents results on a tangential (meridional) surface, and the solid line represents results on a sagittal (radial) surface.

More specifically, as shown in FIGS. 4A and 4B and FIGS. 5A and 5B, largely moving the second lens group 12 toward the object side in focusing from an infinite object to a closest distance object may greatly change astigmatism generated in the second lens group 12 from a value under a reference value to a value over the reference value. During the change, the height of a light ray of a light flux for forming an image having a maximum image height, which passes the center of the aperture stop and passes the first lens group 11, is changed from the height Yinf to the height Ynear. In the embodiment, the plane S1 and the plane S2 satisfying the conditional expression (2) are formed in such a manner that the optical powers thereof are locally decreased, as the light ray is away from the optical axis (in other words, in such a manner that the negative optical powers are increased). Accordingly, astigmatism of a value under the reference value is strongly generated on the side of the image height Ynear, as compared with the side of the image height Yinf. In this way, a local change in the optical power of the plane S1 and the plane S2, and a change in the height of a light ray passing the first lens group 11 cancels out a change in the astigmatism resulting from movement of the second lens group 12.

In the embodiment, the plane S1 and the plane S2 satisfying the conditional expression (2) have curvature radii of a same sign, and satisfies the conditional expression (3). In the above configuration, it is possible to suppress other aberrations such as spherical aberration and coma aberration, while securing the effect by the conditional expression (2). In other words, exceeding the upper limit of the conditional expression (3) excessively increases the distance between the plane S1 and the plane S2, and resultantly increases aberration on the plane S1 and on the plane S2, which is not preferable.

Further, the macro lens 1 satisfies the following conditional expression (7), assuming that f1 is the focal length of the first lens group.

$$-0.1 < f2/f1 < 0.2 \tag{7}$$

FIGS. 6A through 6D are diagrams for describing an off-axis principal ray and an on-axis light ray in the macro lens.

Figure 6A:
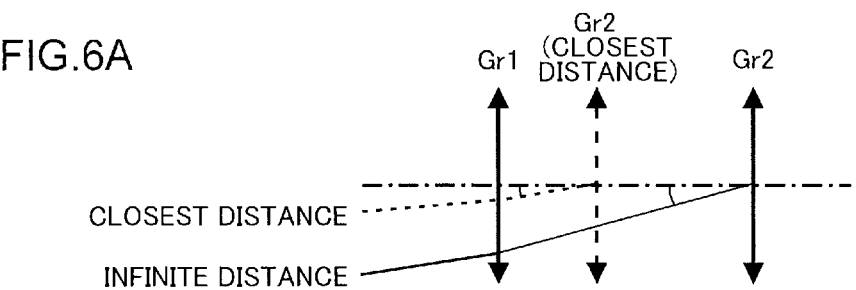
FIGS. 6A through 6D are diagrams for describing an off-axis principal ray and an on-axis light ray in the macro lens.
Figure 6B:
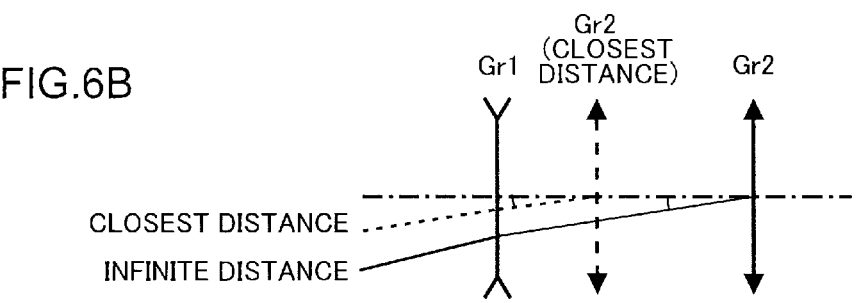
Figure 6C:
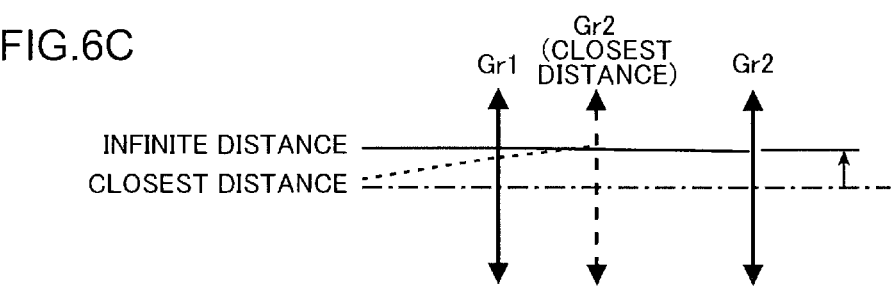
Figure 6D:
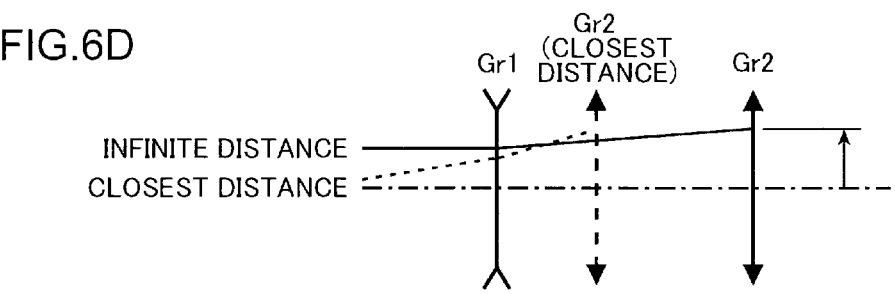

FIG. 6A shows an off-axis principal ray, in the case where the optical power of the first lens group is relatively strong, FIG. 6B shows an off-axis principal ray, in the case where the optical power of the first lens group is relatively weak, FIG. 6C shows an on-axis light ray, in the case where the optical power of the first lens group is relatively strong, and FIG. 6D shows an on-axis light ray, in the case where the optical power of the first lens group is relatively weak. In FIGS. 6A through 6D, a configuration that a lens group has a relatively strong optical power means a configuration that the lens group has a positive refractive power, and a configuration that a lens group has a relatively weak optical power means a configuration that the lens group has a negative refractive power. This does not mean that the absolute value of optical power is large or small. Accordingly, in the case where the magnitude of optical power is expressed in terms of an absolute value of optical power, a lens group having a relatively weak optical power in FIGS. 6A through 6D is a lens group having a large negative refractive power.

The conditional expression (7) is an expression that defines a relationship between the optical powers of the first lens group 11 and the second lens group 12, and is a conditional expression for adjusting a variation in the incident angle of an off-axis light ray and for appropriately correcting spherical aberration and coma aberration. In the thus-configured macro lens 1, as is obvious from a comparison between the cases shown in FIGS. 6A and 6B, exceeding the upper limit of the conditional expression (7) increases a difference between the incident angle of an off-axis light ray in focusing an infinite object shown in FIG. 6A, and the incident angle of an off-axis light ray in focusing a closest distance object shown in FIG. 6A, as compared with a difference between the incident angle of an off-axis light ray in focusing an infinite object shown in FIG. 6B, and the incident angle of an off-axis light ray in focusing a closest distance object shown in FIG. 6B. Thus, a variation in the incident angle of an off-axis light ray incident to the second lens group 12 increases, depending on the position of the second lens group 12. As a result, a variation in astigmatism or coma aberration in the second lens group 12 increases in the course of focusing, which is not preferable. On the other hand, falling below the lower limit of the conditional expression (7) decreases a variation in the incident angle of an off-axis light ray in the second lens group 12 in the course of focusing. However, as is obvious from a comparison between the cases shown in FIG. 6C and FIG. 6D, the height of an on-axis light ray incident to the second lens group shown in FIG. 6D is high, as compared with the height of an on-axis light ray incident to the second lens group shown in FIG. 6C. This results in an increase in the height of an on-axis light ray incident to the second lens group 12, and makes it difficult to correct spherical aberration and coma aberration in the second lens group 12, which is not preferable.

In view of the above, the macro lens 1 may preferably satisfy the following conditional expression (7A).

$$-0.05 \le f2/f1 \le 0.015 \tag{7A}$$

Further, in the macro lens 1, the first lens group 11 includes at least one positive lens element (the positive meniscus lens element 112 in the example shown in FIG. 1), and at least one negative lens element (the negative meniscus lens element 111 in the example shown in FIG. 1).

In the thus-configured macro lens 1, since the first lens group 11 includes at least one positive lens element and at least one negative lens element, it is possible to obtain a degree of freedom in disposing the plane S1 and the plane S2 satisfying the conditional expression (2) and the conditional expression (3), while suppressing the optical power of the first lens group 11 in such a manner as to satisfy the conditional expression (7).

Further, in the macro lens 1, the plane S1 is an object-side plane in a space disposed between the positive lens element (the positive meniscus lens element 112 in the example shown in FIG. 1), and the negative lens element (the negative meniscus lens element 111 in the example shown in FIG. 1), and the plane S2 is an image-side plane in the space. The macro lens 1 satisfies the following conditional expression (8), assuming that r1 is a curvature radius of the plane S1, and r2 is a curvature radius of the plane S2.

$$3<|(r1+r2)/(r1-r2)| \tag{8}$$

The conditional expression (8) is an expression that defines the shape of an air lens element to be defined by the plane S1 and the plane S2, and is a conditional expression for appropriately correcting spherical aberration and coma aberration. In the thus-configured macro lens 1, an air lens element is defined by the plane S1 and the plane S2, and the macro lens 1 satisfies the conditional expression (8). This enables to suppress spherical aberration and coma aberration, while satisfying the conditional expression (2). Specifically, falling below the lower limit of the conditional expression (8) excessively increases a curvature difference between the plane S1 and the plane S2, and increases spherical aberration and coma aberration on the plane S1 and on the plane S2, which is not preferable.

Further, the macro lens 1 satisfies the following conditional expression (9), assuming that f3 is a focal length of the third lens group 13.

$$-0.6<f2/f3<0.1 \tag{9}$$

The conditional expression (9) is an expression that defines a relationship between optical powers of the second lens group 12 and the third lens group 13, and is a conditional expression for appropriately correcting spherical aberration and coma aberration. In the thus-configured macro lens 1, exceeding the upper limit of the conditional expression (9) excessively increases the positive optical power of the third lens group 13, and makes it difficult to obtain sufficient back focus, which is not preferable. On the other hand, falling below the lower limit of the conditional expression (9) excessively increases the negative optical power of the third lens group 13, which may increase the height of an on-axis light ray in the second lens group 12. As a result, it is difficult to correct spherical aberration and coma aberration in the second lens group, which is not preferable.

In view of the above, the macro lens 1 may preferably satisfy the following conditional expression (9A).

$$-0.5 \leq f3/f1 \leq 0 \tag{9A}$$

Further, in the macro lens 1, the third lens group 13 includes at least one positive lens element (the positive meniscus lens element 131, the positive meniscus lens element 133 in the example shown in FIG. 1), and at least one negative lens element (the negative lens element 132 in the example shown in FIG. 1).

In the thus-configured macro lens 1, disposing at least one positive lens element and at least one negative lens element in the third lens group 13, in which the height of an off-axis light ray tends to increase, is advantageous in correcting astigmatism and coma aberration.

Further, in the macro lens 1, the second lens group 12 includes at least one aspherical surface (in the example shown in FIG. 1, both surfaces of the positive lens element 121 are aspherical).

In the macro lens 1, convergence power necessary for the entire optical system is mainly given by the second lens group 12. Accordingly, it is important to suppress aberrations in the second lens group 12. In view of the above, it is required to increase the degree of freedom in correcting aberrations in the second lens group 12. Increasing the number of lens elements in an attempt to increase the degree of freedom may increase the weight of a lens group, which is not preferable for the second lens group 12 to be moved in focusing. The macro lens 1, in which the second lens group 12 has at least one aspherical surface, is advantageous in correcting aberrations as required, while suppressing an increase in the number of lens elements. In the example shown in FIG. 1, since both surfaces of the positive lens element 121 are aspherical, this is advantageous in correcting aberrations as required, while suppressing an increase in the number of lens elements.

In the macro lens 1, preferably, the first lens group 11 has at least one aspherical surface, and the aspherical surface corresponds to either one of the plane S1 and the plane S2.

In the macro lens 1, the first lens group 11 has at least one aspherical surface, and the aspherical surface corresponds to one of the plane S1 and the plane S2. This is advantageous in satisfying the conditional expression (2), while suppressing spherical aberration and coma aberration.

Further, in the macro lens 1, vibration control may be performed by moving a part of the lens elements of the third lens group 13 in a direction perpendicular to the optical axis. Examples of vibration to be suppressed include so-called camera shake by the user, vibration resulting from up and down movements of a mirror in a single-lens reflex camera, vibration of a camera resulting from application of an external force such as strong wind, and vibration of a camera fixedly mounted to a movable object such as a vehicle, resulting from the movable object.

The position of the third lens group 13 is fixed with respect to the image plane. Accordingly, the magnification of the third lens group 13 does not change in focusing. In the thus-configured macro lens 1, the vibration control sensitivity of a lens group (vibration control lens group) for use in vibration control in the third lens group 13 is set to a constant value in the whole range of focusing from an infinite distance to a closest distance. Thus, the vibration control is simplified.

In the embodiment, vibration control is performed by detecting vibration such as camera shake by the user, with use of a sensor called a vibration gyro, and by shifting the vibration control lens group in a direction orthogonal to the optical axis in accordance with an amount of the detected vibration in such a manner as to cancel out the detected vibration, by a predetermined moving mechanism. Such a vibration control by shifting an optical system is disclosed as camera shake correction in e.g. Japanese Unexamined Patent Publication No. 2007-150996 and Japanese Unexamined Patent Publication No. 2010-136269.

Further, in the macro lens 1, preferably, the vibration control lens group to be moved for performing the vibration control is a lens group (the positive meniscus lens element 131 and the negative lens element 132, or the positive meniscus lens element 131, or the negative lens element 132 in the example shown in FIG. 1) which is disposed on the object side than the positive lens element (the positive meniscus lens element 133 in the example shown in FIG. 1), which is disposed at a position closest to the image side in the third lens group 13. The macro lens 1 satisfies the following conditional expression (10), assuming that βv is a paraxial lateral magnification of the vibration control lens group in focusing an infinite object.

$$2<\beta v<9 \tag{10}$$

In the thus-configured macro lens 1, the positive lens element disposed at the position closest to the image side is fixed in the vibration control, and a lens group disposed on the object side than the aforementioned positive lens element is used as the vibration control lens group. In the thus-configured macro lens 1, the inside of a lens barrel is sealably closed by the aforementioned positive lens element. This is advantageous in preventing intrusion of dust or moisture. Further, the macro lens 1 satisfying the conditional expression (10) is advantageous in obtaining appropriate vibration control sensitivity. Specifically, falling below the lower limit of the conditional expression (10) weakens the vibration control sensitivity, increases the required moving amount of the vibration control lens group, and requires driving means having a large output for driving the vibration control lens group, which is not preferable. On the other hand, exceeding the upper limit of the conditional expression (10) excessively increases the vibration control sensitivity, and requires position detecting means having a high measurement precision for detecting the position of the vibration control lens group, which is not preferable.

Further, in the case where a resin lens element is used in the macro lens 1, it is preferable to use a lens element molded by using a material, in which particles of 30 nm or smaller as a maximum diameter are dispersed in plastic (resin material).

Generally, if fine particles are mixed with a transparent resin material, light is scattered, which lowers the transmittance. Thus, it has been difficult to use such a material as an optical material. However, by setting the size of the fine particles to a value smaller than the wavelength of a transmitted light flux, light is not substantially scattered. As temperature rises, the refractive index of the resin material is lowered. Conversely, as temperature rises, the refractive index of inorganic particles is raised. Accordingly, it is possible to generally keep the refractive index unchanged with respect to a temperature change by cancelling out the refractive indexes, taking advantage of such temperature dependencies. More specifically, it is possible to obtain a resin material having a refractive index with less temperature dependence by dispersing inorganic particles having a maximum diameter of 30 nm or smaller in the resin material as a base material. For example, fine particles of niobium oxide ($Nb_2O_5$) are dispersed in acrylic resin. In the macro lens 1 thus constructed, variation of the image point position at the time of temperature change in the entirety of the macro lens 1 can be suppressed by using a resin material containing inorganic fine particle dispersants for a lens element having a relatively large refractive power, or for all the lens elements.

It is preferable to mold such a resin lens element containing inorganic fine particles as a dispersant as follows.

A refractive index change with temperature is described as follows. A refractive index change n(T) with temperature is expressed by the following formula (Fa) by differentiating a refractive index n by temperature T based on the Lorentz-Lorentz formula.

$$n(T)=((n^2+2)\times(n^2-1))/6n\times(-3\alpha+(1/[R])\times(\partial[R]/\partial T))$$ (Fa)

where $\alpha$ denotes a linear expansion coefficient and [R] denotes a molecular refraction.

In the case of a resin material, contribution of the refractive index to the temperature dependence is generally smaller in the second term than in the first term of the formula Fa, and can be substantially ignored. For instance, in the case of a PMMA resin, the linear expansion coefficient $\alpha$ is $7\times10^{-5}$, and, if the linear expansion coefficient $\alpha$ is substituted into the formula (Fa), $n(T)=-12\times10^{-5}$ (/° C.), which substantially coincides with an actual measurement value.

Specifically, the refractive index change n(T) with temperature, which has conventionally been about $-12\times10^{-5}$ (/° C.), is preferably suppressed to below $8\times10^{-5}$ (1° C.) in absolute value, and more preferably suppressed to below $6\times10^{-5}$ (/° C.) in absolute value.

In view of the above, it is preferable to use a resin material containing polyolefin, a resin material containing polycarbonate, or a resin material containing polyester, as such a resin material. The refractive index change n(T) with temperature is about $-11\times10^{-5}$ (/° C.) in the resin material containing polyolefin, about $-14\times10^{-5}$ (1° C.) in the resin material containing polycarbonate, and about $-13\times10^{-5}$ (/° C.) in the resin material containing polyester.

<Description on Imaging Apparatus with Macro Lens>

Figure 7:
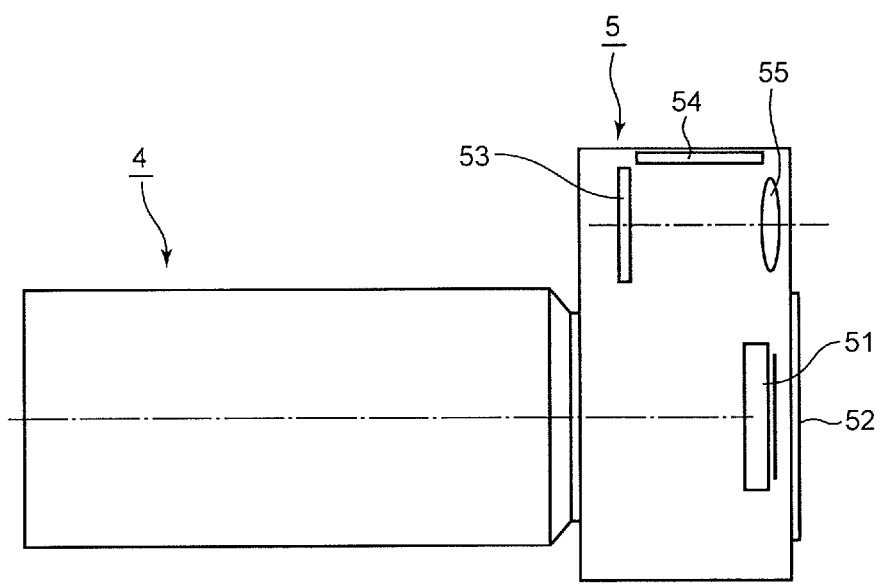
FIG. 7 is a block diagram showing a configuration of an imaging apparatus to be used in combination with the macro lens.

In this section, a mirrorless type imaging apparatus i.e. an imaging apparatus without a reflex mirror to be used in combination with the aforementioned macro lens 1 is described. In this section, there is described a case, in which the macro lens 1 is used in combination with a mirrorless type imaging apparatus. Alternatively, the macro lens 1 may be used in combination with an imaging apparatus provided with a reflex mirror. FIG. 7 is a block diagram showing a configuration of an imaging apparatus combinable with the macro lens. Referring to FIG. 7, an imaging apparatus 3 is provided with an interchangeable lens unit 4 and an imaging apparatus main body 5.

The interchangeable lens unit 4 is an optical system detachably attachable to the imaging apparatus main body 5. The interchangeable lens unit 4 is provided with the macro lens 1 as shown in FIG. 1 and functioning as an imaging lens, an unillustrated lens driving device for driving a focus lens in the optical axis direction for focusing, and an unillustrated moving mechanism (vibration control mechanism) for driving a lens group for vibration control so as to perform vibration control such as camera shake correction.

The imaging apparatus main body 5 is provided with an imaging element 51, a first display device 52, a second display device 53 for viewfinder, a processing controller 54, and an eyepiece lens 55. Light rays from an object are formed on the light receiving surface of the imaging element 51 by the macro lens 1 in the interchangeable lens unit 4, whereby an optical image of the object is formed.

The imaging element 51 converts an optical image of an object formed by the macro lens 1 in the interchangeable lens unit 4 into electrical signals (image signals) of respective color components of R, G and B, and outputs these electrical signals to the processing controller 54 as image signals of the respective colors of R, G and B. The imaging element 51 is a two-dimensional image sensor such as a CCD (Charge-Coupled Devices) image sensor, or a CMOS (Complementary Metal-Oxide Semiconductor) image sensor. The processing controller 54 controls an imaging operation such as a readout operation of output signals from the respective pixels in the imaging element 51 (including horizontal synchronization, vertical synchronization, transfer). The imaging element 51 performs at least one of still image imaging operation and moving image imaging operation under the control of the processing controller 54.

The processing controller 54 generates image data of an image of an object based on image signals of the respective color components of R, G, and B outputted from the imaging element 51. More specifically, the processing controller 54 performs an amplification processing, a digital conversion processing and the like with respect to analog output signals from the imaging element 51, performs known image processings such as determination of a proper black level, gamma-correction, white balance adjustment (WB adjustment), outline correction and color unevenness correction for the entire image, and generates image data from the image signals. The processing controller 54 performs a predetermined image processing such as resolution conversion with respect to the image data. The processing controller 54 outputs the image data to each of a first display device 52 and the second display device 53. Further, the processing controller 54 controls the entirety of the imaging apparatus main body 5. By the control, the imaging apparatus main body 5 is controlled to execute at least one of still image photographing and moving image photographing of an object. The processing controller 54 is constituted of e.g. a microprocessor, a storage element, and peripheral circuits.

Further, the processing controller 54 may be so configured as to correct aberrations, which could not be corrected by the macro lens 1, by performing a known distortion correction processing for correcting a distortion in an optical image of an object formed on the light receiving surface of the imaging element 51, as necessary. A distortion correction is correcting an image distorted by aberrations into a natural image substantially free from distortion and having a similar shape as a scene seen by the naked eye. By such a configuration, even if an optical image of an object introduced to the imaging element 51 by the macro lens 1 is distorted, a natural image substantially free from distortion can be generated. Further, in a configuration for correcting a distortion by an image processing by means of an information processing, only the aberrations other than the distortion have to be considered, wherefore a degree of freedom in the design of the macro lens 1 is increased, and an easier design becomes possible.

Further, the processing controller 54 may also perform a known peripheral illuminance reduction correction processing for correcting a reduction in peripheral illuminance in an optical image of an object formed on the light receiving surface of the imaging element 51. The peripheral illuminance reduction correction (shading correction) is performed by storing correction data for the peripheral illuminance reduction correction beforehand, and multiplying a photographed image (pixels) with the correction data. Since the reduction in peripheral illuminance mainly occurs due to incident angle dependence of sensitivity of the imaging element 51, lens vignetting, cosine fourth law and the like, the correction data is set at such a specified value as to correct an illuminance reduction caused by these factors. By employing such a configuration, it is possible to generate an image having a sufficient illuminance up to the periphery, even if peripheral illuminance is reduced in an optical image of an object introduced to the imaging element 51 by the macro lens 1.

In this embodiment, the shading correction may be performed by slightly reducing the pitch of the arrangement of a color filter or an on-chip micro-lens array with respect to the pixel pitch on the imaging surface of the imaging element 51 in such a manner as to reduce the shading. In such a configuration, the color filter or the on-chip micro-lens array is shifted with respect to each pixel, as the imaging surface of the imaging element 51 comes close to the periphery of the imaging surface by slightly reducing the pitch as described above. Accordingly, it is possible to efficiently guide a light flux incident in an oblique direction to a light receiving portion of each pixel. This is advantageous in suppressing the shading occurred in the imaging element 51.

The first display device 52 is disposed on the back surface of the imaging apparatus main body 5, and displays an image of an object by image data to be outputted from the processing controller 54. Examples of the first display device 52 are an LCD (liquid crystal display) and an organic EL display. The first display device 52 displays a live-view image.

The second display device 53 is disposed in the imaging apparatus main body 5, and displays an image of an object by image data to be outputted from the processing controller 54, as an electronic viewfinder. Examples of the second display device 53 are an LCD (liquid crystal display) and an organic EL display. An image displayed on the second display device 53 is viewed through the eyepiece lens 55.

As described above, the imaging apparatus 3 is mounted with an interchangeable lens unit. Alternatively, the imaging apparatus 3 may be integrally provided with an imaging apparatus main body, and with an imaging optical system of the macro lens 1. Further, the second display device 53 and the eyepiece lens 55 may be omitted. Further, a vibration gyro for detecting vibration, or a vibration control device which controls the unillustrated moving mechanism to drive the vibration control lens group for vibration control, based on the detection result of the vibration gyro, may be incorporated in the interchangeable lens unit 4, or may be incorporated in the imaging apparatus main body 5. Alternatively, the vibration gyro and the vibration control device may be individually incorporated in the interchangeable lens unit 4 and in the imaging apparatus main body 5.

In the thus-configured imaging apparatus 3, in the case where a still image is photographed, the processing controller 54 controls the imaging apparatus 3 and the imaging apparatus main body 5 to perform the still image photographing, and controls the unillustrated lens driving device to move the focus lens for focusing. Further, the lens group in the macro lens 1 in the interchangeable lens unit 4 performs vibration control such as camera shake correction. By the above configuration, a focused optical image is repeatedly and cyclically formed on the light receiving surface of the imaging element 51, and is converted into image signals of the respective color components of R, G and B. Thereafter, the image signals are outputted to the processing controller 54. The image signals are subjected to an image processing by the processing controller 54. Thereafter, an image based on the processed image signals is displayed on each of the first display device 52 and the second display device 53. Then, the photographer is allowed to adjust the position of the main object so that the main object is located at an intended position within a screen by viewing the first display device 52, or by viewing the second display device 53 through the eyepiece lens 55. When a shutter button (not shown) is depressed in this state, image data is stored in a storage element as a still image memory in the processing controller 54. Thus, a still image is obtained.

In the case where a moving image photographing is performed, the processing controller 54 controls the imaging apparatus 3 and the imaging apparatus main body 5 to perform the moving image photographing. Then, the photographer is allowed to adjust the position of the image of the object so that the image of the object is located at an intended position within a screen by viewing the first display device 52 or by viewing the second display device 53 through the eyepiece lens 55 substantially in the same manner as the still image photographing. When the photographer depresses the shutter button (not shown) in this state, the moving image photographing is started. At the time of the moving image photographing, the processing controller 54 controls the imaging apparatus 3 and the imaging apparatus main body 5 to perform the moving image photographing, and controls, the unillustrated lens driving device for focusing. Further, the lens group in the macro lens 1 in the interchangeable lens unit 4 performs vibration control. By the above configuration, a focused optical image is repeatedly and cyclically formed on the light receiving surface of the imaging element 51, and is converted into image signals of the respective color components of R, G and B. Thereafter, the converted image signals are outputted to the processing controller 54. The image signals are subjected to an image processing by the processing controller 54. Thereafter, an image based on the processed image signals is displayed individually on the first display device 52 and on the second display device 53. When the photographer depresses the shutter button (not shown) again, the moving image photographing is ended. The photographed moving image is stored in the storage element as a moving image memory in the processing controller 54. Thus, a moving image is obtained. It should be noted that a zooming operation is performed by the photographer, as necessary.

The thus-configured imaging apparatus 3 is provided with the macro lens 1 capable of advantageously increasing the moving speed of a lens group to be moved in focusing, and reducing the weight of the lens group, while suppressing aberration variation in the range from an infinite distance to a closest distance. Accordingly, the thus-configured imaging apparatus 3 is advantageous in performing focusing noiselessly and lightly, thereby forming an optical image, in which various aberrations are advantageously corrected in the range from an infinite distance to a closest distance, on the light receiving surface of the imaging element.

<Description on Practical Examples of Macro Lenses>

In the following, practical constructions of the macro lens 1 as shown in FIG. 1 i.e. of the macro lens 1 incorporated in the imaging apparatus 3 as shown in FIG. 7 are described with reference to the drawings.

EXAMPLES

FIGS. 8A through 12C are sectional views showing arrangements of lens elements in macro lenses 1A through 1E as Examples 1 through 5. In the drawings of FIGS. 8A through 12C, FIGS. 8A, 9A, 10A, 11A, and 12A show a case, in which an infinite object is focused, FIGS. 8C, 9C, 10C, 11C, and 12C show a case, in which a closest distance object is focused, and FIGS. 8B, 9B, 10B, 11B, and 12B show a case, in which an object is focused between an infinite distance and a closest distance. FIGS. 13A through 33C are aberration diagrams of the macro lenses 1A through 1E as Examples 1 through 5.

Figure 11A:
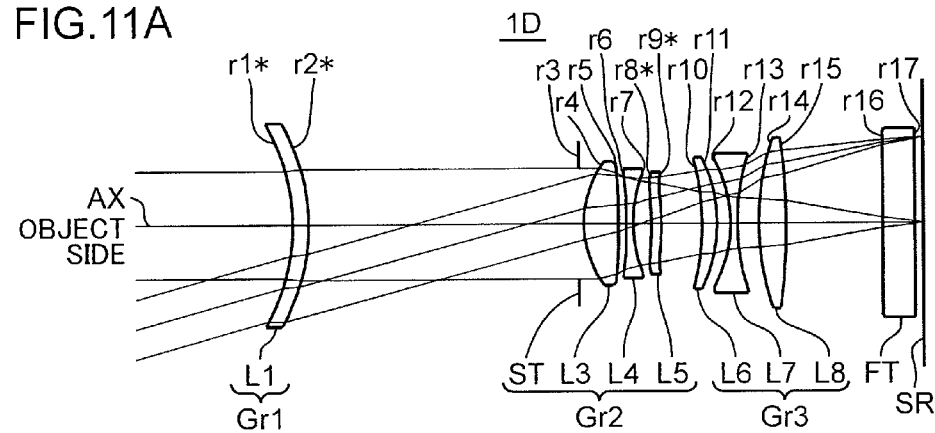
FIGS. 11A through 11C are cross-sectional views showing an arrangement of lens groups in a macro lens as Example 4.
Figure 11B:
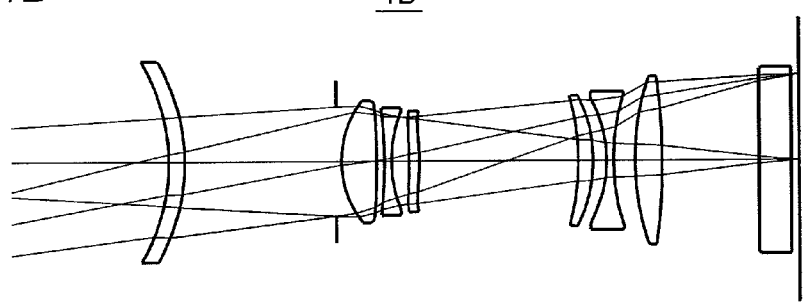
Figure 11C:
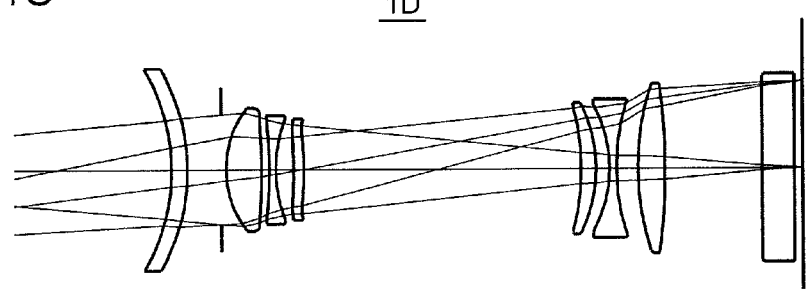
Figure 12A:
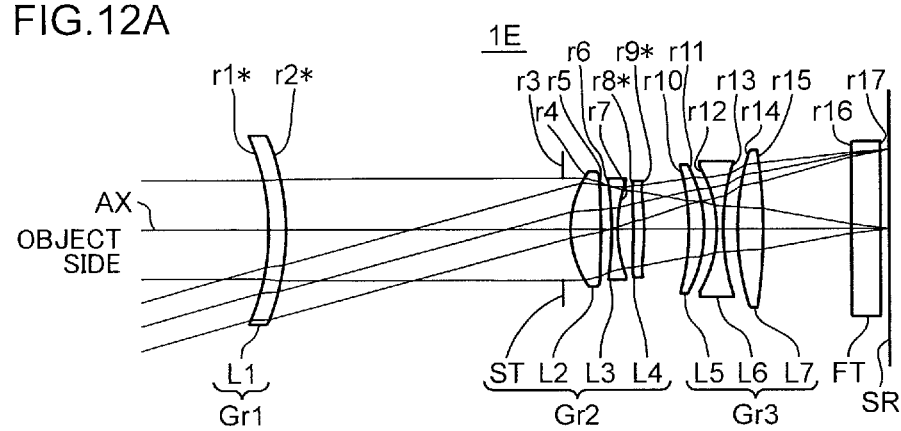
FIGS. 12A through 12C are cross-sectional views showing an arrangement of lens groups in a macro lens as Example 5.
Figure 12B:
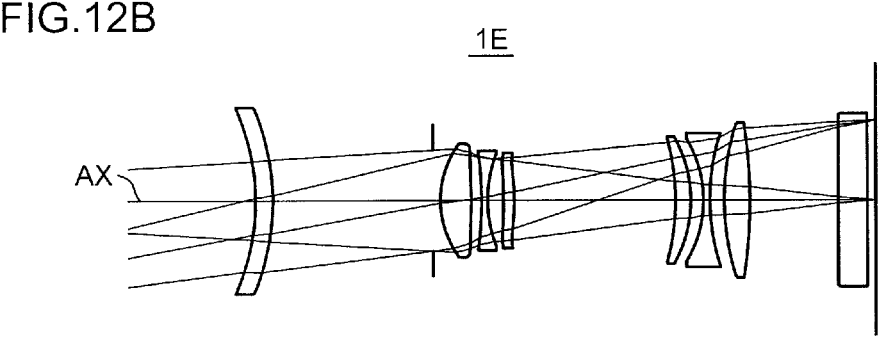
Figure 12C:
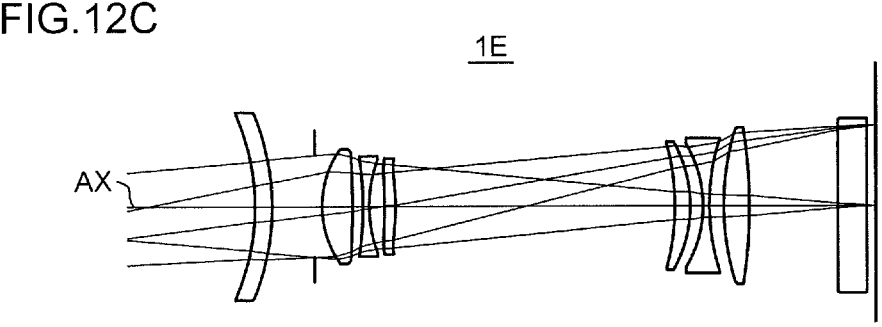
Figure 14A:
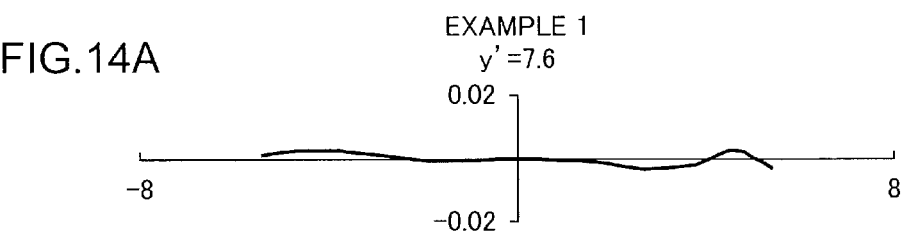
FIGS. 14A and 14B are lateral aberration diagrams (at infinite distance, in ordinary state) of the macro lens as Example 1.
Figure 14B:
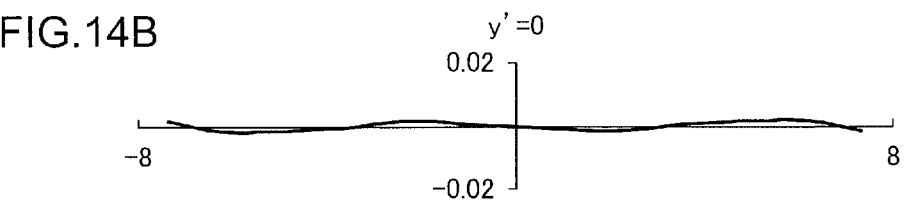
Figure 15A:
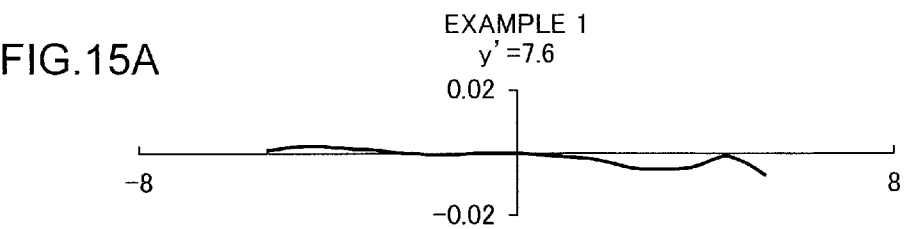
FIGS. 15A, 15B, and 15C are lateral aberration diagrams (at infinite distance, 0.3 degree-correction) of the macro lens as Example 1.
Figure 15B:
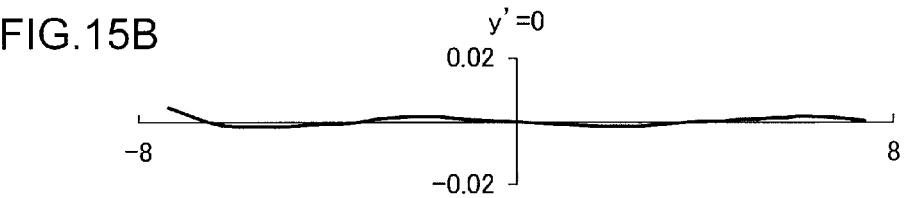
Figure 15C:
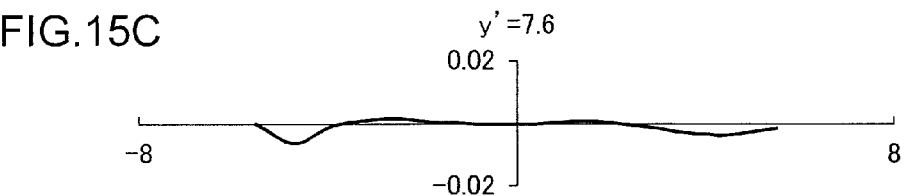
Figure 16A:
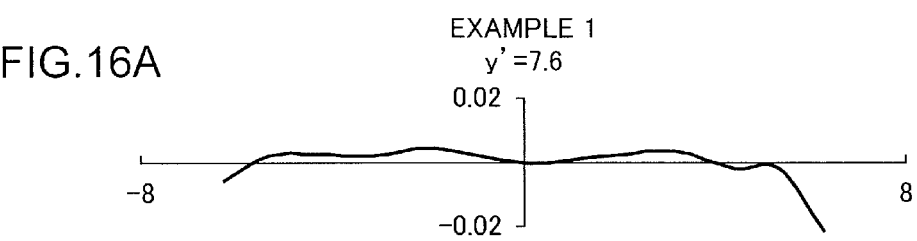
FIGS. 16A and 16B are lateral aberration diagrams ($\beta=-1.0$, in ordinary state) of the macro lens as Example 1.
Figure 16B:
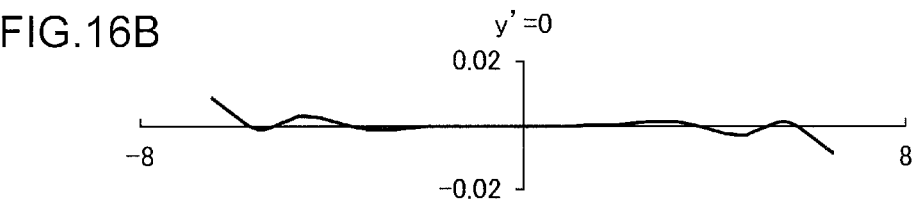
Figure 17A:
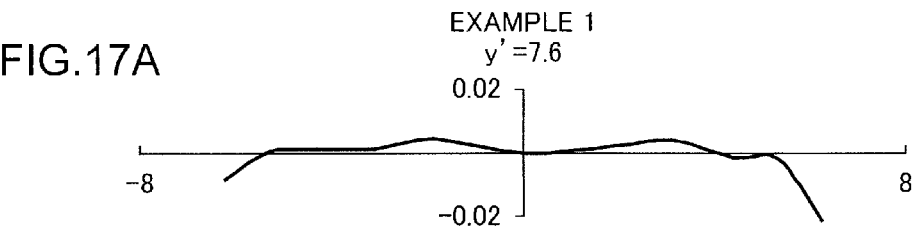
FIGS. 17A, 17B and 17C are lateral aberration diagrams ($\beta=-1.0$, 0.3 degree-correction) of the macro lens as Example 1.
Figure 17B:
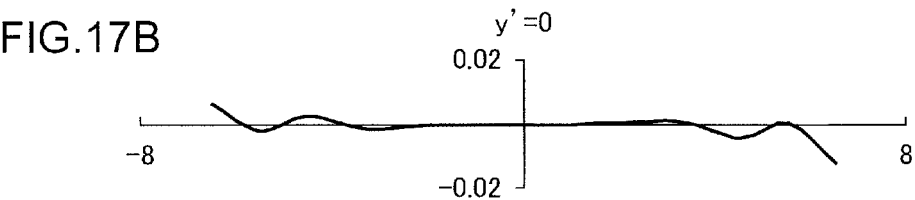
Figure 17C:
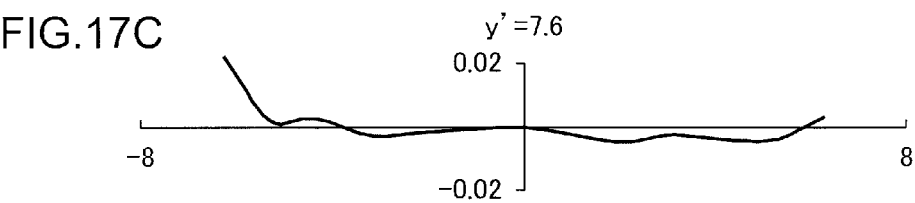
Figure 19A:
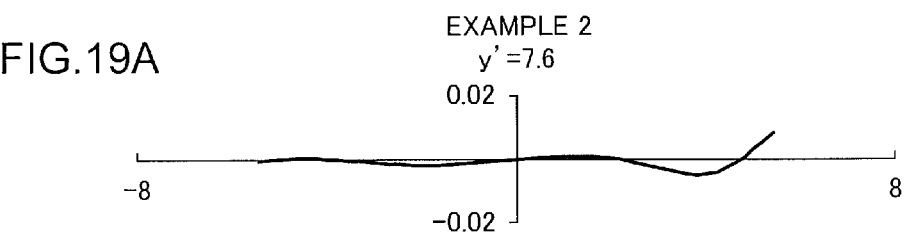
FIGS. 19A and 19B are lateral aberration diagrams (at infinite distance, in ordinary state) of the macro lens as Example 2.
Figure 19B:
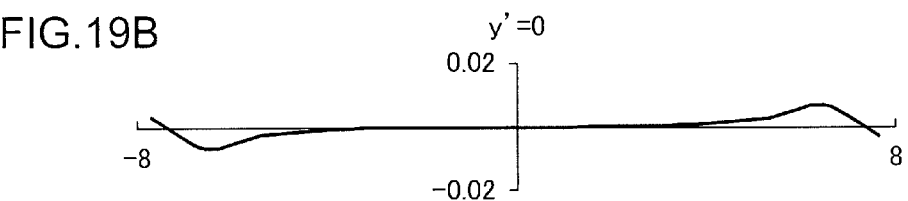
Figure 20A:
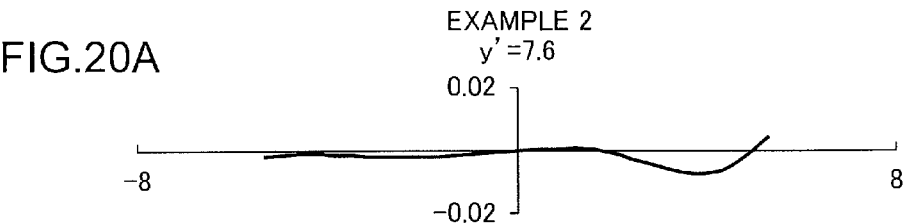
FIGS. 20A, 20B and 20C are lateral aberration diagrams (at infinite distance, 0.3 degree-correction) of the macro lens as Example 2.
Figure 20B:
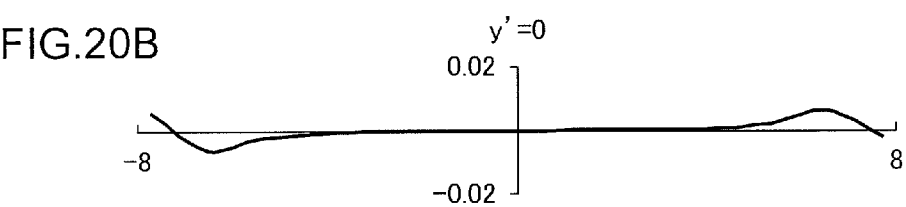
Figure 20C:
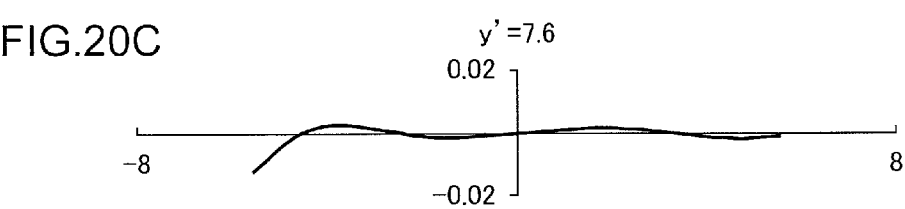
Figure 21A:
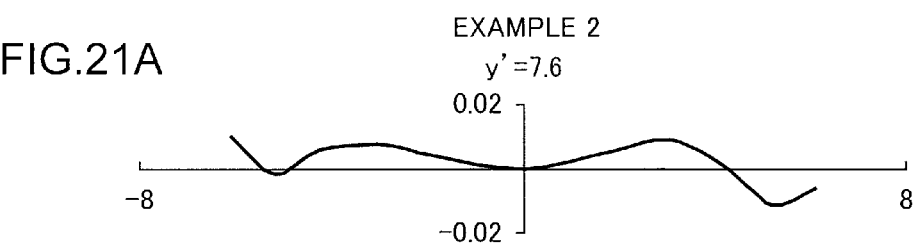
FIGS. 21A and 21B are lateral aberration diagrams ($\beta=-1.0$, in ordinary state) of the macro lens as Example 2.
Figure 21B:
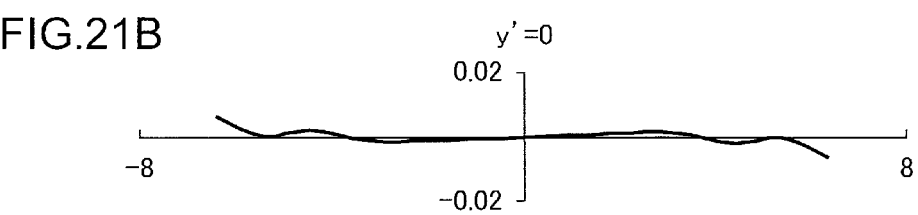
Figure 22A:
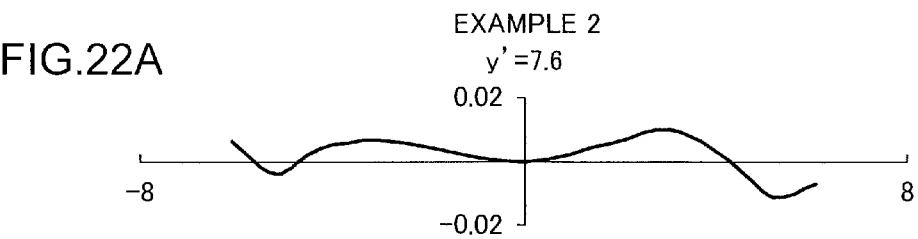
FIGS. 22A, 22B and 22C are lateral aberration diagrams ($\beta=-1.0$, 0.3 degree-correction) of the macro lens as Example 2.
Figure 22B:
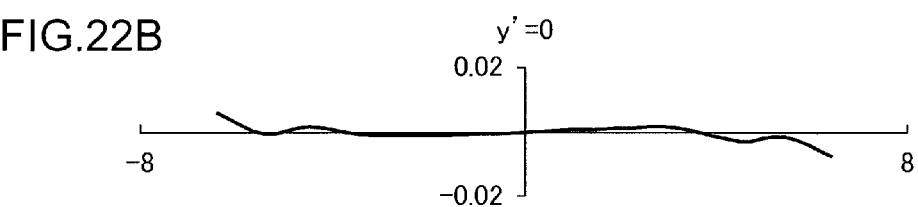
Figure 22C:
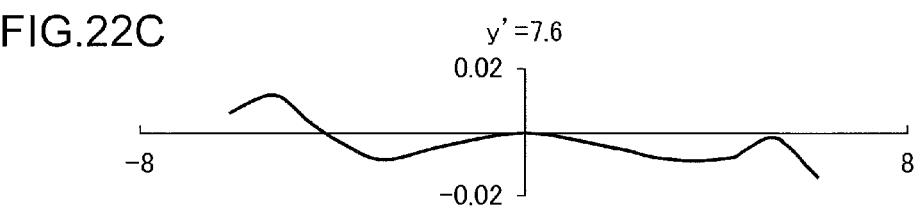
Figure 25A:
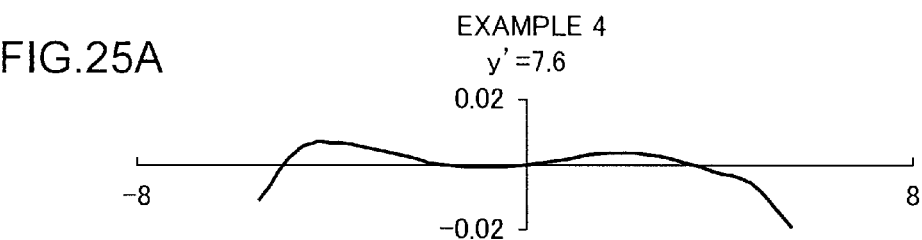
FIGS. 25A and 25B are lateral aberration diagrams (at infinite distance, in ordinary state) of the macro lens as Example 4.
Figure 25B:
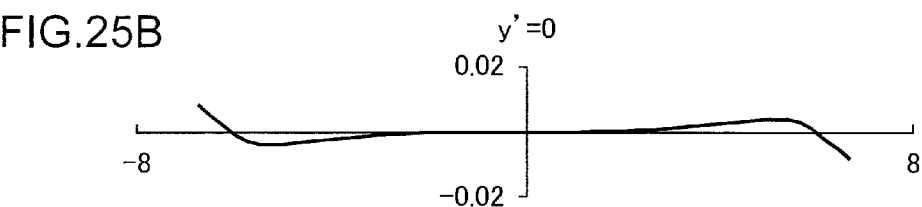
Figure 26A:
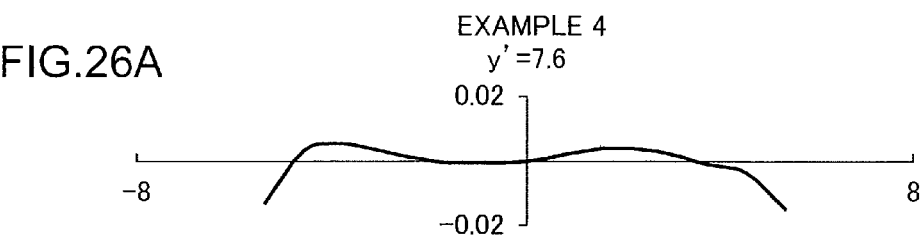
FIGS. 26A, 26B and 26C are lateral aberration diagrams (at infinite distance, 0.3 degree-correction) of the macro lens as Example 4.
Figure 26B:
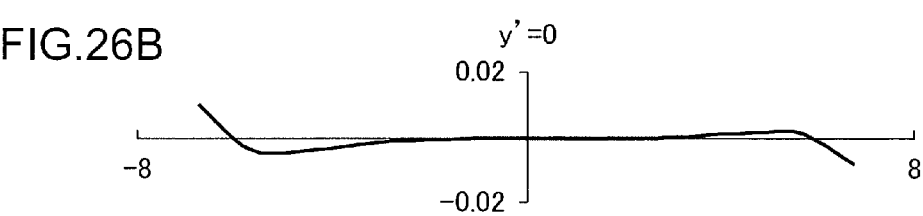
Figure 26C:
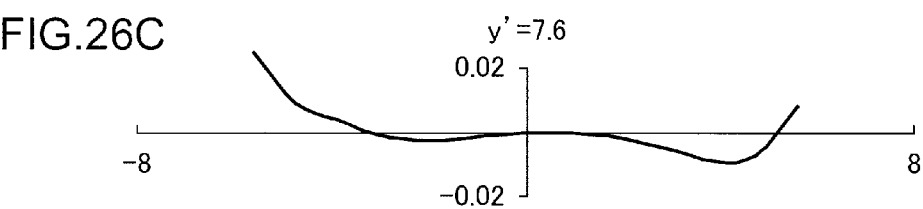
Figure 27A:
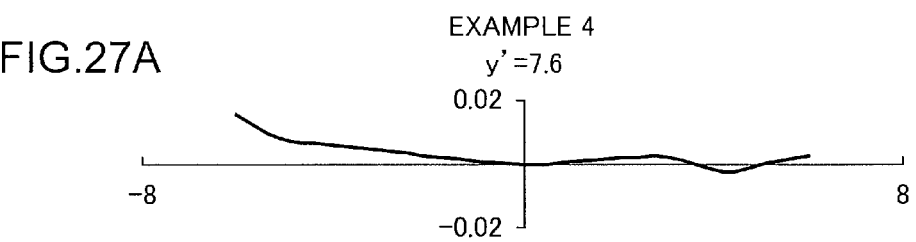
FIGS. 27A and 27B are lateral aberration diagrams ($\beta=-1.0$, in ordinary state) of the macro lens as Example 4.
Figure 27B:
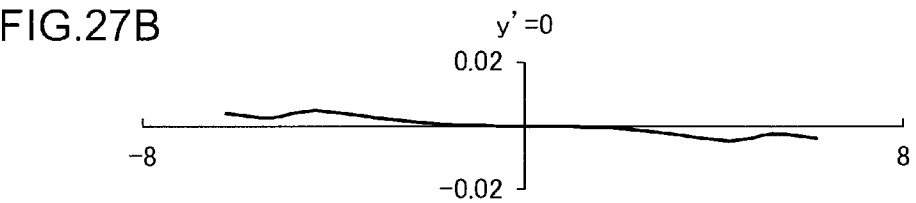
Figure 28A:
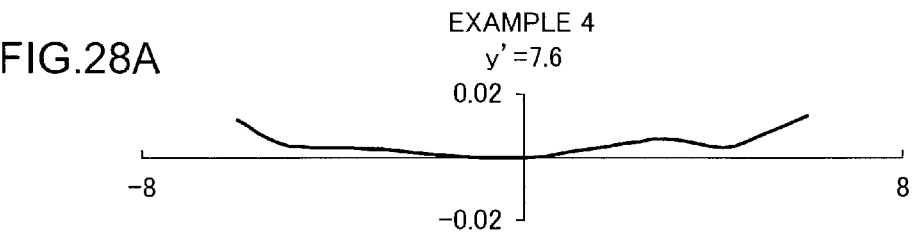
FIGS. 28A, 28B and 28C are lateral aberration diagrams ($\beta=-1.0$, 0.3 degree-correction) of the macro lens as Example 4.
Figure 28B:
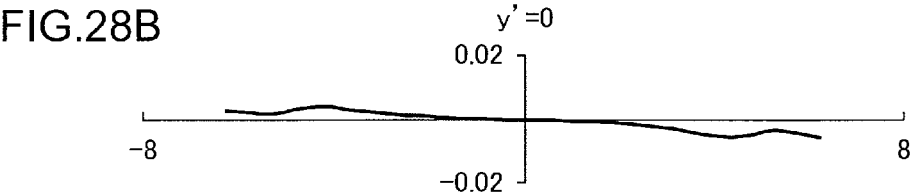
Figure 28C:
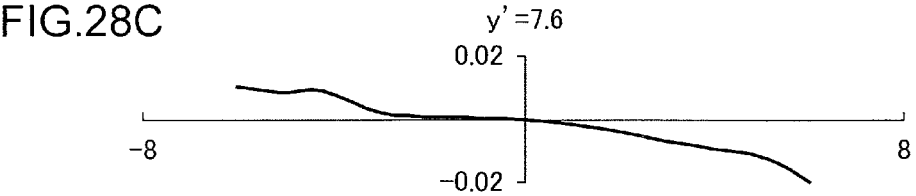
Figure 30A:
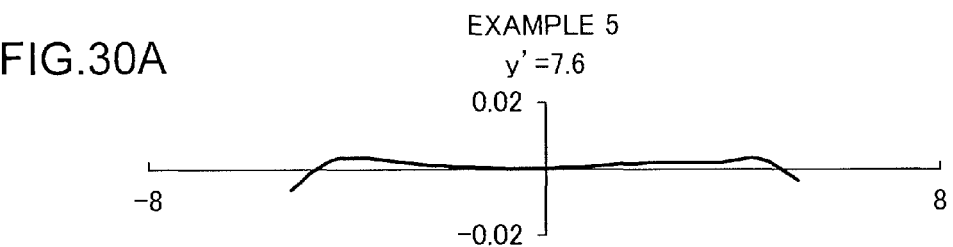
FIGS. 30A and 30B are lateral aberration diagrams (at infinite distance, in ordinary state) of the macro lens as Example 5.
Figure 30B:
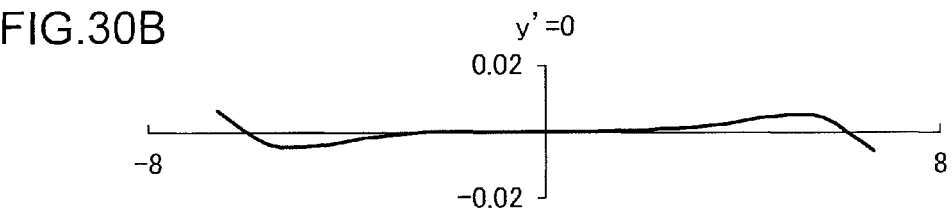
Figure 31A:
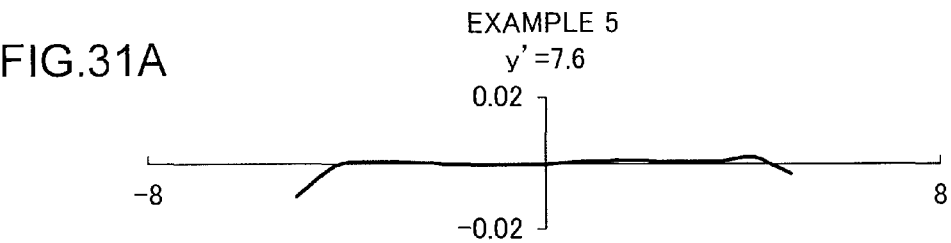
FIGS. 31A, 31B and 31C are lateral aberration diagrams (at infinite distance, 0.3 degree-correction) of the macro lens as Example 5.
Figure 31B:
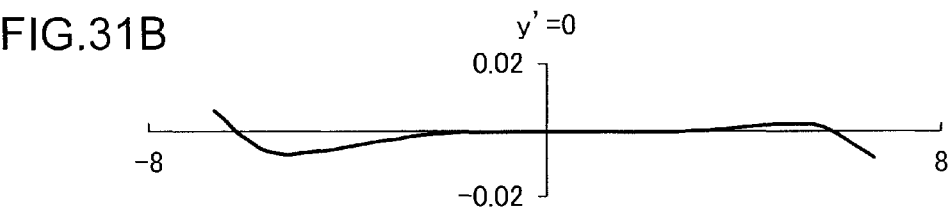
Figure 31C:
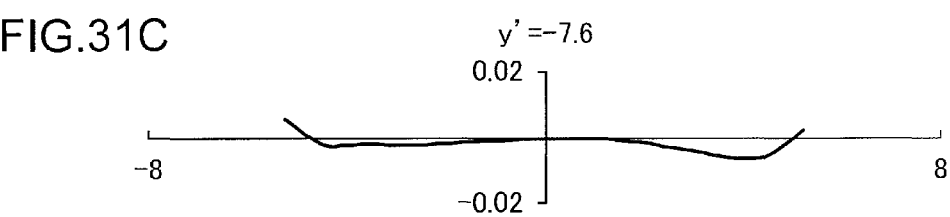
Figure 32A:
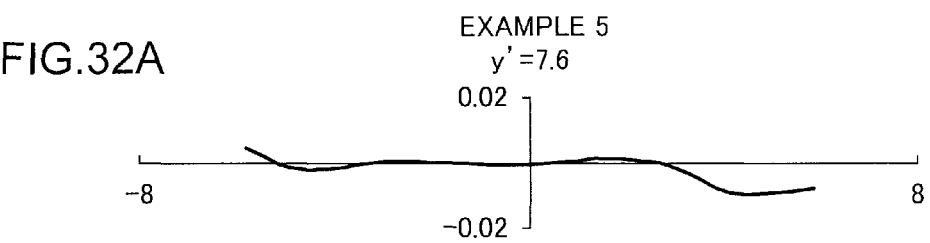
FIGS. 32A and 32B are lateral aberration diagrams ($\beta=-1.0$, in ordinary state) of the macro lens as Example 5.
Figure 32B:
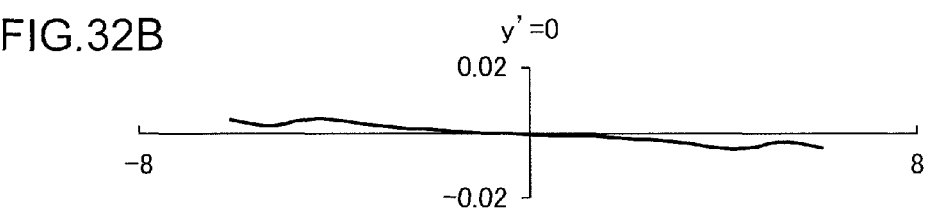
Figure 33A:
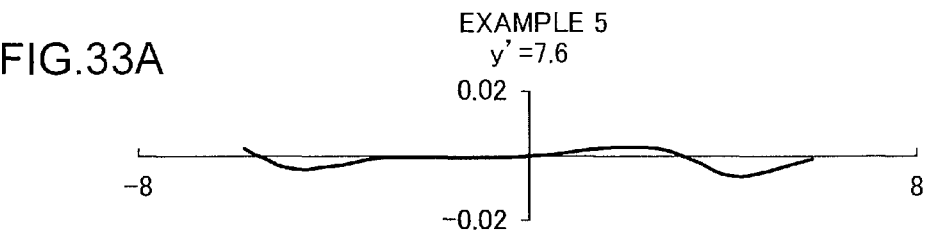
FIGS. 33A, 33B and 33C are lateral aberration diagrams ($\beta=-1.0$, 0.3 degree-correction) of the macro lens as Example 5.
Figure 33B:
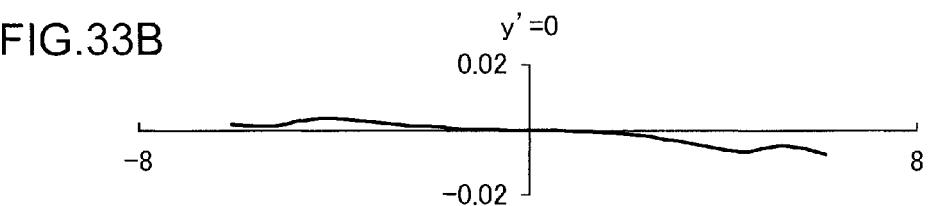
Figure 33C:
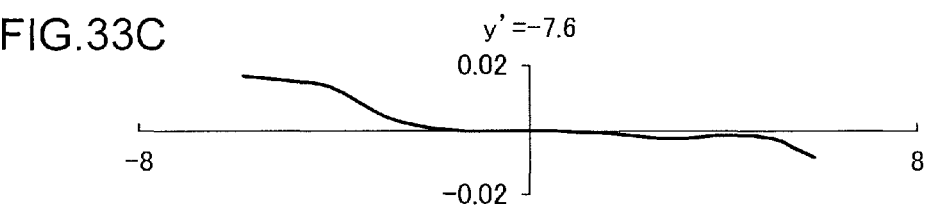

As shown in FIGS. 8A through 11C, each of the macro lenses 1A through 1D as Examples 1 through 4 is generally provided with a first lens group Gr1 having a positive refractive power as a whole, a second lens group Gr2 having a positive refractive power as a whole, and a third lens group Gr3 having a negative refractive power as a whole. On the other hand, as shown in FIGS. 12A through 12C, the macro lens 1E as Example 5 is generally provided with a first lens group Gr1 having a negative refractive power as a whole, a second lens group Gr2 having a positive refractive power as a whole, and a third lens group Gr3 having a positive refractive power as a whole. In the macro lenses 1A through 1E as Examples 1 through 5, the first through third lens groups Gr1 through Gr3 are disposed in this order from the object side to the image side; and in focusing, the first lens group Gr1 and the third lens group Gr3 are fixed, and the second lens group Gr2 is moved in the optical axis AX direction. Further, an optical diaphragm ST is disposed at a position closest to the object side in the second lens group Gr2. Specifically, the optical diaphragm ST to be moved together with the second lens group Gr2 is disposed between the first lens group Gr1 and the second lens group Gr2.

More specifically, in each of the macro lenses 1A through 1E as Examples 1 through 5, the first through third lens groups Gr1 through Gr3 have the following configuration in the order from the object side to the image side.

Figure 8A:
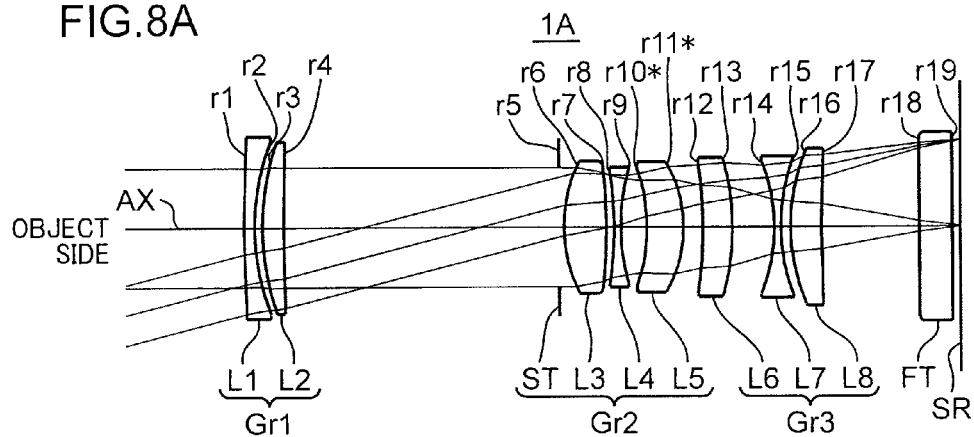
FIGS. 8A through 8C are cross-sectional views showing an arrangement of lens groups in a macro lens as Example 1.
Figure 8B:
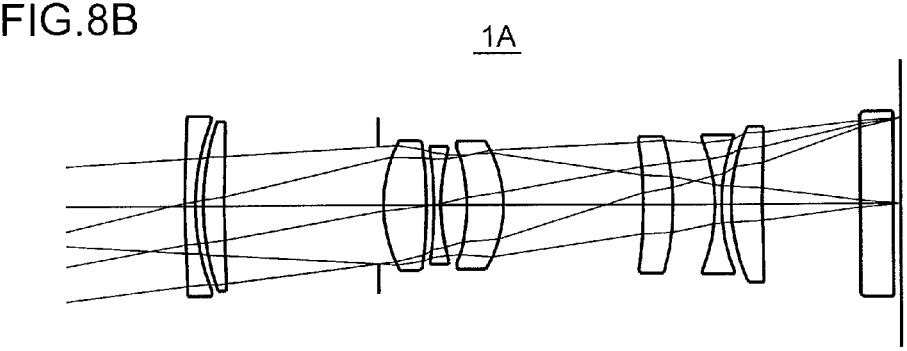
Figure 8C:
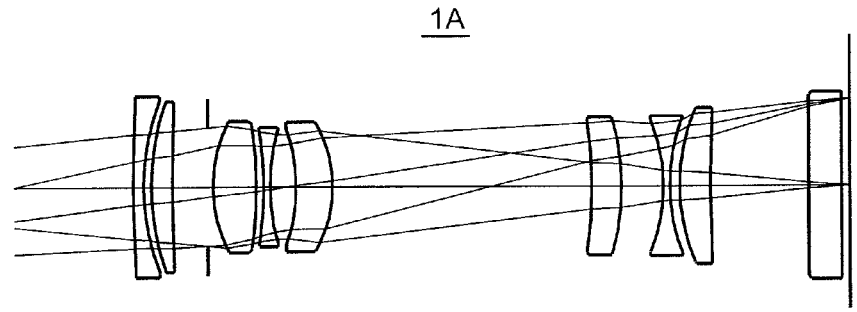

Firstly, a case of the macro lens 1A as Example 1 is described. As shown in FIG. 8A, the first lens group Gr1 is provided with a first lens element L1 as a meniscus lens element concave toward the image side and having a negative refractive power, and a second lens element L2 as a positive meniscus lens element convex toward the object side and having a positive refractive power. The second lens group Gr2 is provided with an optical diaphragm ST, a third lens element L3 as a biconvex positive lens element having a positive refractive power, a fourth lens element L4 as a biconcave negative lens element having a negative refractive power, and a fifth lens element L5 as a positive meniscus lens element convex toward the image side and having a positive refractive power. Both surfaces of the fifth lens element L5 are aspherical. The third lens group Gr3 is provided with a sixth lens element L6 as a positive meniscus lens element convex toward the image side and having a positive refractive power, a seventh lens element L7 as a biconcave negative lens element having a negative refractive power, and an eighth lens element L8 as a positive meniscus lens element convex toward the object side and having a positive refractive power. Further, in Example 1, the third lens group Gr3 includes a lens group (vibration control lens group) for performing vibration control (shake correction) such as camera shake correction. More specifically, in the third lens group Gr3, shake correction is performed by moving the sixth lens element L6 and the seventh lens element L7 in a direction perpendicular to the optical axis AX.

Figure 9A:
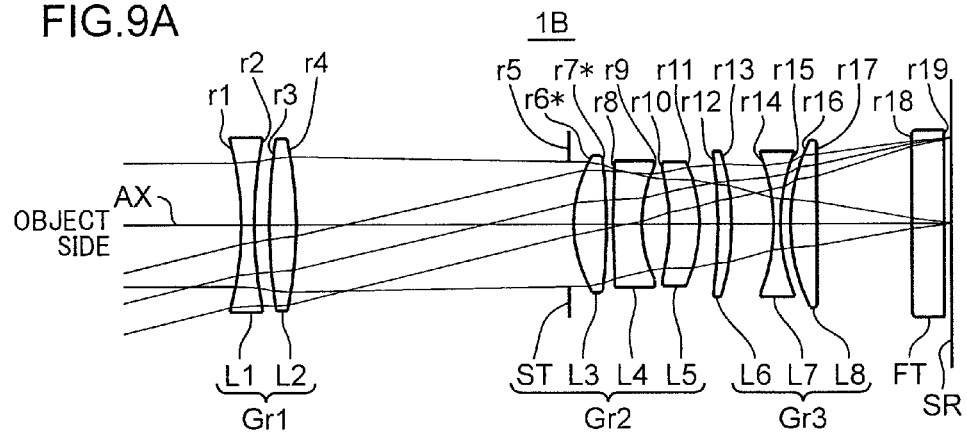
FIGS. 9A through 9C are cross-sectional views showing an arrangement of lens groups in a macro lens as Example 2.
Figure 9B:
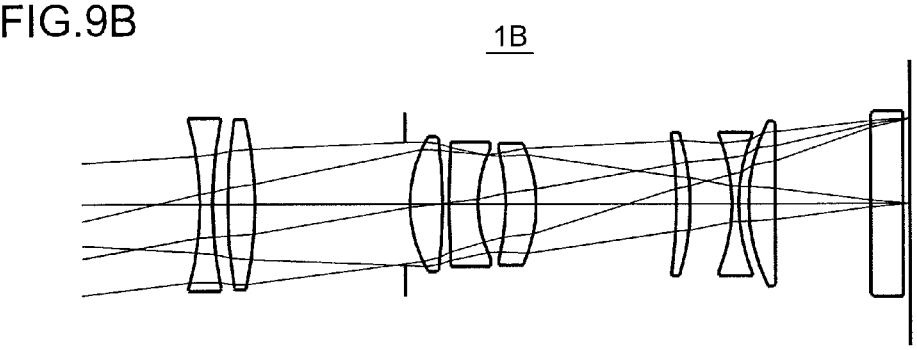
Figure 9C:
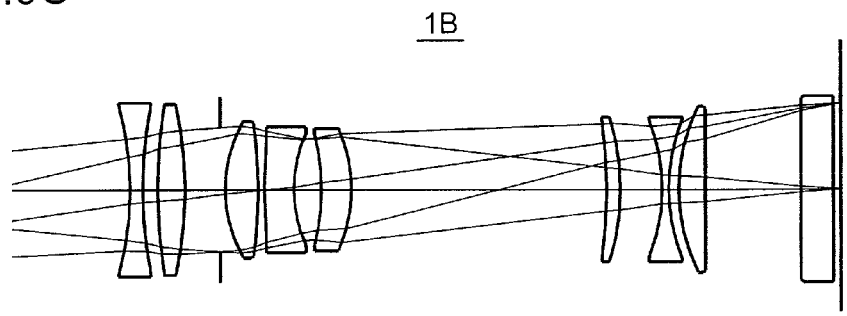

Next, a case of the macro lens 1B as Example 2 is described. As shown in FIG. 9A, the first lens group Gr1 is provided with a first lens element L1 as a biconcave negative lens element having a negative refractive power, and a second lens element L2 as a biconvex positive lens element having a positive refractive power. The second lens group Gr2 is provided with an optical diaphragm ST, a third lens element L3 as a biconvex positive lens element having a positive refractive power, a fourth lens element L4 as a negative meniscus lens element concave toward the image side and having a negative refractive power, and a fifth lens element L5 as a positive meniscus lens element convex toward the image side and having a positive refractive power. Both surfaces of the third lens element L3 are aspherical. The third lens group Gr3 is provided with a sixth lens element L6 as a positive meniscus lens element convex toward the image side and having a positive refractive power, a seventh lens element L7 as a biconcave negative lens element having a negative refractive power, and an eighth lens element L8 as a biconvex positive lens element having a positive refractive power. Further, in Example 2, the third lens group Gr3 includes a lens group for performing vibration control. Similarly to Example 1, in the third lens group GR3, shake correction is performed by moving the sixth lens element L6 and the seventh lens element L7 in a direction perpendicular to the optical axis AX.

Figure 10A:
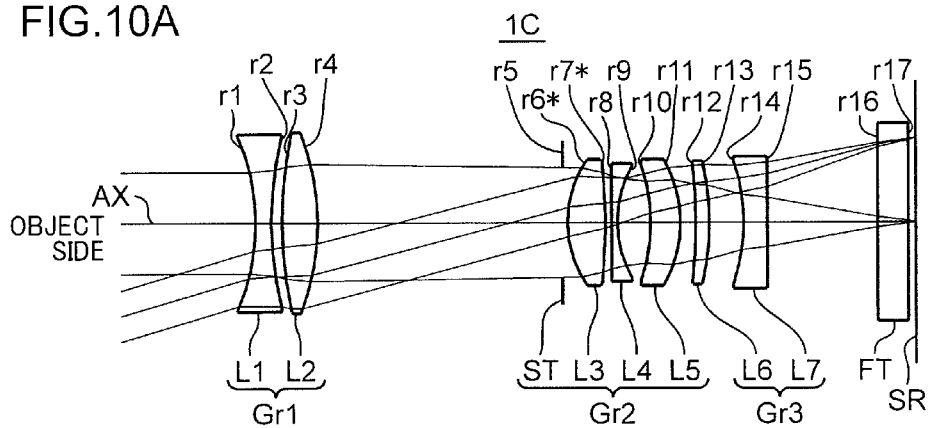
FIGS. 10A through 10C are cross-sectional views showing an arrangement of lens groups in a macro lens as Example 3.
Figure 10B:
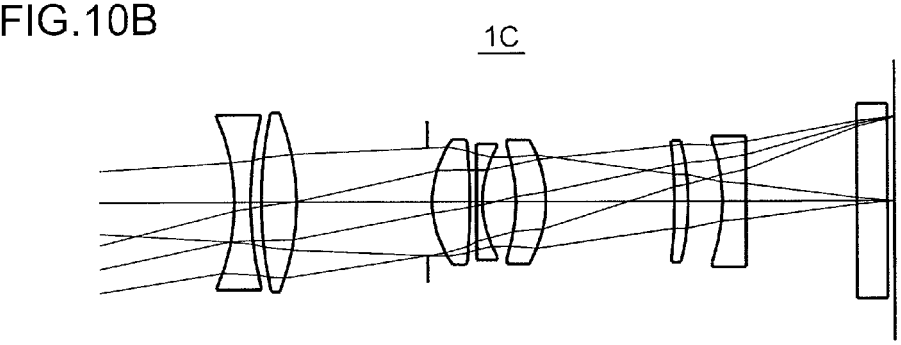
Figure 10C:
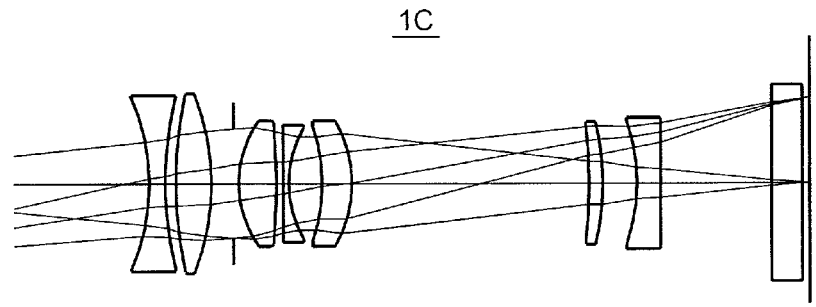

Further, unlike the macro lens 1B as Example 2, the macro lens 1C as Example 3 does not have a shake correction function, and is not provided with an eighth lens element L8. Specifically, as shown in FIG. 10A, in the macro lens 10 as Example 3, the first lens group Gr1 is provided with a first lens element L1 as a biconcave negative lens element, and a second lens element L2 as a biconvex positive lens element; the second lens group Gr2 is provided with an optical diaphragm ST, a third lens element L3 as a biconvex positive lens element and having both surfaces of an aspherical shape, a fourth lens element L4 as a negative meniscus lens element, and a fifth lens element L5 as a positive meniscus lens element; and the third lens group Gr3 is provided with a sixth lens element L6 as a positive meniscus lens element convex toward the image side and having a positive refractive power, and a seventh lens element L7 as a biconcave negative lens element having a negative refractive power. The macro lens 1C as Example 3 does not include a lens group for performing vibration control.

Further, unlike the macro lens 1A as Example 1, in the macro lens 1D as Example 4, the first lens group Gr1 is constituted of one lens element, and a lens element at a position closest to the image side in the third lens group Gr3 is different from the corresponding lens element in the macro lens 1A. Specifically, as shown in FIG. 11A, in the macro lens 1D as Example 4, the first lens group Gr1 is constituted of a first lens element L1 as a positive meniscus lens element convex toward the image side and having a positive refractive power. Both surfaces of the first lens element L1 are aspherical. Unlike the macro lenses 1A through 1C as Examples 1 through 3, the macro lenses 1D is not provided with a second lens element L2. In the macro lens 1D, the second lens group Gr2 is provided with an optical diaphragm ST, a third lens element L3 as a biconvex positive lens element, a fourth lens element L4 as a biconcave negative lens element, and a fifth lens element L5 as a positive meniscus lens element convex toward the image side and having both surfaces of an aspherical shape. The third lens group Gr3 is provided with a sixth lens element L6 as a positive meniscus lens element, a seventh lens element L7 as a biconcave negative lens element, and an eighth lens element L8 as a biconvex positive lens element having a positive refractive power. Further, in Example 4, the third lens group Gr3 includes a lens group for performing vibration control. Similarly to Example 1, in the third lens group Gr3, shake correction is performed by moving the sixth lens element L6 and the seventh lens element L7 in a direction perpendicular to the optical axis AX.

Next, a case of the macro lens 1E as Example 5 is described. As shown in FIG. 12A, the first lens group Gr1 is constituted of one lens element, specifically, is constituted of a first lens element L1 as a negative meniscus lens element concave toward the object side and having a negative refractive power. Both surfaces of the first lens element L1 are aspherical. The second lens group Gr2 is provided with an optical diaphragm ST, a second lens element L2 as a biconvex positive lens element having a positive refractive power, a third lens element L3 as a biconcave negative lens element having a negative refractive power, and a fourth lens element L4 as a positive meniscus lens element convex toward the image side and having a positive refractive power. Both surfaces of the fourth lens element L4 are aspherical. The third lens group Gr3 is provided with a fifth lens element L5 as a positive meniscus lens element convex toward the image side and having a positive refractive power, a sixth lens element. L6 as a biconcave negative lens element having a negative refractive power, and a seventh lens element L7 as a biconvex positive lens element having a positive refractive power. Further, in Example 5, the third lens group Gr3 includes a lens group for performing vibration control (shake correction) such as camera shake correction. More specifically, in the third lens group Gr3, shake correction is performed by moving the fifth lens element L5 and the sixth lens element L6 in a direction perpendicular to the optical axis AX.

In Examples 1 through 5, the optical diaphragm ST may be an aperture stop, a mechanical shutter, or a variable aperture stop.

In Examples 1 through 5, the light receiving surface of an imaging element SR is disposed on the image side of the third lens group Gr3, with a parallel plate FT serving as a filter being interposed between the imaging element SR and the third lens group Gr3. The parallel plate FT may be one of the optical filters or a cover glass for the imaging element SR.

In each of the drawings of FIGS. 8A through 12C, the symbol "ri" (i=1, 2, 3, attached to each of the lens surfaces indicates the i-th lens surface counted from the object side. It should be noted that a surface of a cemented lens is counted as a lens surface; and the surface of the optical diaphragm ST, both surfaces of the flat plate FT, and the light receiving surface of the imaging element SR are also regarded as a surface. The aforementioned handling and definition on the symbols hold true to Examples 1 through 5. However, this does not mean that everything is the same between Examples 1 through 5. For instance, throughout the drawings of FIGS. 8A through 12C showing Examples 1 through 5, the lens surface closest to the object side is attached with the same symbol "ri". However, this does not mean that the curvatures of the lens surfaces attached with the same symbol are identical to each other throughout Examples 1 through 5.

In the above configuration, light rays incident from the object side successively pass through the first lens group Gr1, the second lens Group Gr2 (including the optical diaphragm ST), the third lens group Gr3, and the flat plate FT along the optical axis AX, and form an optical image of an object on the light receiving surface of the imaging element SR. Then, the imaging element SR converts the optical image into an electrical signal. The electrical signal is applied with a specified digital image processing as necessary, and is stored as a digital image signal in a memory of a digital apparatus such as a digital camera, or transmitted to another digital apparatus by wired or wireless communication.

In Examples 1 through 5, focusing is performed by moving the second lens group Gr2 in the optical axis direction. More specifically, the second lens group Gr2 is moved from the image side to the object side in focusing from an infinite object to a close distance object, whereby focusing is performed.

Construction data of the respective lens elements in the macro lenses 1A through 1E as Examples 1 through 5 are as follows.

Construction data of the respective lens elements in the macro lens 1A as Example 1 are shown below.

Numerical Data in Example 1

| Unit: mm | | | | |
|---|---|---|---|---|
| Lens Surface Data | | | | |
| lens surface | r | d | nd | vd |
| object plane | ∞ | ∞ | | |
| 1 | 172.304 | 1.352 | 1.63854 | 55.43 |
| 2 | 29.030 | 1.033 | | |
| 3 | 32.351 | 2.610 | 1.69680 | 55.48 |
| 4 | 223.680 | d4 (variable) | | |
| 5 (aperture stop) | ∞ | 0.600 | | |
| 6 | 18.046 | 5.435 | 1.72916 | 54.66 |
| 7 | −62.749 | 0.937 | | |
| 8 | −49.238 | 0.800 | 1.71736 | 29.50 |
| 9 | 25.997 | 3.246 | | |
| 10* | −28.486 | 4.615 | 1.58313 | 59.38 |
| 11* | −16.523 | d11 (variable) | | |
| 12 | −62.204 | 3.750 | 1.84666 | 23.78 |
| 13 | −30.376 | 5.296 | | |
| 14 | −21.234 | 0.800 | 1.68893 | 31.16 |
| 15 | 23.649 | 1.245 | | |
| 16 | 24.125 | 3.826 | 1.91082 | 35.25 |
| 17 | 192.790 | 12.339 | | |

-continued

Unit: mm

| | | | | |
|---|---|---|---|---|
| 18 | ∞ | 4.056 | 1.51680 | 64.20 |
| 19 | ∞ | 0.000 | | |
| image plane | ∞ | | | |

Aspherical Surface Data tenth surface

K = 0.0, A4 = −1.30461E−04, A6 = 6.40508E−07, A8 = −1.87185E−08, A10 = 2.18764E−10
eleventh surface K = 0.0, A4 = −4.35469E−05, A6 = 3.17186E−07, A8 = −5.11035E−09, A10 = 6.14698E−11

Various Data

| | | |
|---|---|---|
| focal length (f) | 42.960 (mm) | |
| F-number (Fno) | 2.920 | |
| half angle of view (w/2) | 14.130 (mm) | |
| image height (maximum) (y max) | 10.815 (mm) | |

| β | infinite distance | −0.5 time | −1.0 time |
|---|---|---|---|
| d0 | ∞ | −94.122 | −65.544 (mm) |
| d4 | 34.595 | 19.408 | 4.446 (mm) |
| d11 | 2.447 | 17.634 | 32.596 (mm) |
| total length (TL) of lens system | 89.982 | 89.982 | 89.982 (mm) |
| back focus (Bf) | 1.000 | 1.000 | 1.000 (mm) |
| effective F-number | — | 3.988 | 5.065 |

Data of each lens group

| Group number | first surface | focal length (mm) |
|---|---|---|
| 1 | 1 | 1966.643 |
| 2 | 5 | 36.574 |
| 3 | 12 | −97.449 |

Next, construction data of the respective lens elements in the macro lens 1B as Example 2 are shown below.

Numerical Data in Example 2

Unit: mm

Lens Surface Data

| lens surface | r | d | nd | vd |
|---|---|---|---|---|
| object plane | ∞ | ∞ | | |
| 1 | −39.937 | 1.500 | 1.53172 | 48.87 |
| 2 | 52.240 | 1.972 | | |
| 3 | 71.671 | 3.480 | 1.72916 | 54.66 |
| 4 | −51.749 | d4 (variable) | | |
| 5 (aperture stop) | ∞ | 0.600 | | |
| 6* | 16.436 | 4.125 | 1.58313 | 59.38 |
| 7* | −54.102 | 0.800 | | |
| 8 | 116.144 | 3.681 | 1.71736 | 29.50 |
| 9 | 15.906 | 3.548 | | |
| 10 | −27.926 | 3.844 | 1.62041 | 60.35 |
| 11 | −18.587 | d11 (variable) | | |
| 12 | −62.351 | 1.698 | 1.84666 | 23.78 |
| 13 | −31.256 | 5.290 | | |
| 14 | −22.626 | 0.800 | 1.72342 | 37.99 |
| 15 | 23.106 | 1.273 | | |
| 16 | 23.763 | 3.438 | 1.80420 | 46.49 |
| 17 | −574.352 | 12.000 | | |

-continued

Unit: mm

| | | | | |
|---|---|---|---|---|
| 18 | ∞ | 4.056 | 1.51680 | 64.20 |
| 19 | ∞ | 0.000 | | |
| image plane | ∞ | | | |

Aspherical Surface Data sixth surface

K = 0.0, A4 = −7.88094E−06, A6 = −2.65617E−08, A8 = −1.38043E−09, A10 = 4.09698E−12
seventh surface

K = 0.0, A4 = 4.30004E−05, A6 = −1.75927E−07,

Various Data

| | | |
|---|---|---|
| focal length (f) | 45.000 (mm) | |
| F-number (Fno) | 2.920 | |
| half angle of view (w2) | 13.514 (mm) | |
| image height (maximum) (y max) | 10.815 (mm) | |

| β | infinite distance | −0.5 time | −1.0 time |
|---|---|---|---|
| d0 | ∞ | −99.414 | −65.500 (mm) |
| d4 | 34.494 | 19.010 | 4.474 (mm) |
| d11 | 2.400 | 17.884 | 32.420 (mm) |
| total length (TL) of lens system | 90.000 | 90.000 | 90.000 (mm) |
| back focus (Bf) | 1.000 | 1.000 | 1.000 (mm) |
| effective F-number | — | 4.059 | 5.152 |

Data of each lens group

| Group number | first surface | focal length (mm) |
|---|---|---|
| 1 | 1 | 408.103 |
| 2 | 5 | 41.550 |
| 3 | 12 | −96.428 |

Next, construction data of the respective lens elements in the macro lens 1C as Example 3 are shown below.

Numerical Data in Example 3

Unit: mm

Lens Surface Data

| lens surface | r | d | nd | vd |
|---|---|---|---|---|
| object plane | ∞ | ∞ | | |
| 1 | −27.398 | 2.000 | 1.65844 | 50.84 |
| 2 | 44.901 | 1.379 | | |
| 3 | 54.106 | 4.593 | 1.72916 | 54.66 |
| 4 | −31.269 | d4 (variable) | | |
| 5 (aperture stop) | ∞ | 0.600 | | |
| 6* | 13.541 | 4.835 | 1.58313 | 59.38 |
| 7* | −50.747 | 0.800 | | |
| 8 | 392.684 | 0.800 | 1.69895 | 30.05 |
| 9 | 14.075 | 4.328 | | |
| 10 | −23.207 | 3.846 | 1.72916 | 54.66 |
| 11 | −16.077 | d11 (variable) | | |
| 12 | −69.245 | 1.734 | 2.00100 | 29.14 |
| 13 | −32.788 | 4.407 | | |
| 14 | −23.682 | 3.000 | 1.62004 | 36.30 |
| 15 | 640.221 | 14.213 | | |

-continued

Unit: mm

| | | | | |
|---|---|---|---|---|
| 16 | ∞ | 4.000 | 1.51680 | 64.20 |
| 17 | ∞ | 0.000 | | |
| image plane | ∞ | | | |

Aspherical Surface Data sixth surface

K = 0.0, A4 = −1.82272E−05, A6 = 3.81565E−08, A8 = −4.29832E−10, A10 = 2.22980E−13
seventh surface

K = 0.0, A4 = 6.92694E−05, A6 = −6.61970E−08

Various Data

| | |
|---|---|
| focal length (f) | 37.430 (mm) |
| F-number (Fno) | 2.920 |
| half angle of view (w/2) | 16.116 (mm) |
| image height (maximum) (y max) | 10.815 (mm) |

| β | infinite distance | −0.5 time | −1.0 time |
|---|---|---|---|
| d0 | ∞ | −80.795 | −53.090 (mm) |
| d4 | 31.465 | 16.805 | 2.900 (mm) |
| d11 | 2.000 | 16.661 | 30.565 (mm) |
| total length (TL) of lens system | 89.982 | 89.982 | 89.982 (mm) |
| back focus (Bf) | 0.999 | 0.996 | 0.995 (mm) |
| effective F-number | — | 3.966 | 4.970 |

Data of each lens group

| Group number | first surface | focal length (mm) |
|---|---|---|
| 1 | 1 | 445.504 |
| 2 | 5 | 38.649 |
| 3 | 12 | −110.136 |

Next, construction data of the respective lens elements in the macro lens 1D as Example 4 are shown below.

Numerical Data in Example 4

Unit: mm

Lens Surface Data

| lens surface | r | d | nd | vd |
|---|---|---|---|---|
| object plane | ∞ | ∞ | | |
| 1* | −26.216 | 2.000 | 1.49700 | 81.61 |
| 2* | −26.742 | d2 (variable) | | |
| 3 | ∞ | 0.600 | | |
| 4 | 12.679 | 4.501 | 1.72916 | 54.66 |
| 5 | −104.766 | 1.019 | | |
| 6 | −57.168 | 0.800 | 1.68893 | 31.16 |
| 7 | 16.626 | 2.298 | | |
| 8* | −61.949 | 1.306 | 1.58313 | 59.38 |
| 9* | −32.364 | d9 (variable) | | |
| 10 | −31.472 | 1.950 | 1.90366 | 31.31 |
| 11 | −17.916 | 1.707 | | |
| 12 | −16.501 | 0.800 | 1.68893 | 31.16 |
| 13 | 27.828 | 2.739 | | |
| 14 | 33.012 | 3.502 | 1.90366 | 31.31 |
| 15 | −84.494 | 12.231 | | |

-continued

Unit: mm

| | | | | |
|---|---|---|---|---|
| 16 | ∞ | 4.000 | 1.51680 | 64.20 |
| 17 | ∞ | 0.000 | | |
| image plane | ∞ | | | |

Aspherical Surface Data first surface

K = 0.0, A4 = −2.45079E−05, A6 = 9.43548E−08, A8 = 3.17550E−10, A10 = −1.34820E−12
second surface K = 0.0, A4 = −2.28821E−05, A6 = 1.00645E−07, A8 = 1.66808E−10, A10 = −8.57696E−13
eighth surface K = 0.0, A4 = −5.59147E−05, A6 = 4.42255E−06, A8 = 6.14128E−08, A10 = −6.33674E−10
ninth surface

K = 0.0, A4 = 6.32831E−05, A6 = 4.92341E−06, A8 = 5.06627E−08, A10 = 3.73122E−11

Various Data

| | |
|---|---|
| focal length (f) | 39.241 (mm) |
| F-number (Fno) | 2.920 |
| half angle of view (w/2) | 15.409 (mm) |
| image height (maximum) (y max) | 10.815 (mm) |

| β | infinite distance | −0.5 time | −1.0 time |
|---|---|---|---|
| d0 | ∞ | −95.592 | −70.572 (mm) |
| d2 | 34.398 | 19.327 | 4.300 (mm) |
| d9 | 5.150 | 20.221 | 35.248 (mm) |
| total length (TL) of lens system | 80.000 | 80.002 | 80.006 (mm) |
| back focus (Bf) | 1.000 | 1.002 | 1.006 (mm) |
| Effective F-number | — | 4.289 | 5.679 |

Data of each lens group

| Group number | first surface | focal length (mm) |
|---|---|---|
| 1 | 1 | 10229.472 |
| 2 | 3 | 35.304 |
| 3 | 10 | −8580.279 |

Next, construction data of the respective lens elements in the macro lens 1E as Example 5 are shown below.

Numerical Data in Example 5

Unit: mm

Lens Surface Data

| lens surface | r | d | nd | vd |
|---|---|---|---|---|
| object plane | ∞ | ∞ | | |
| 1* | −32.689 | 2.399 | 1.49700 | 81.61 |
| 2* | −34.084 | d2 (variable) | | |
| 3 (aperture stop) | ∞ | 1.016 | | |
| 4 | 13.316 | 4.238 | 1.72916 | 54.66 |
| 5 | −130.931 | 1.426 | | |
| 6 | −52.326 | 0.800 | 1.68893 | 31.16 |
| 7 | 17.574 | 2.167 | | |
| 8* | −74.587 | 1.489 | 1.58313 | 59.38 |
| 9* | −29.942 | d9 (variable) | | |
| 10 | −32.134 | 2.078 | 1.90366 | 31.31 |
| 11 | −18.056 | 1.799 | | |
| 12 | −16.280 | 0.800 | 1.68893 | 31.16 |
| 13 | 28.914 | 2.016 | | |
| 14 | 34.139 | 3.567 | 1.90366 | 31.31 |
| 15 | −72.078 | 12.000 | | |

-continued

Unit: mm

| | | | | |
|---|---|---|---|---|
| 16 | ∞ | 4.000 | 1.51680 | 64.20 |
| 17 | ∞ | 0.000 | | |

Aspherical Surface Data first surface

K = 0.00000, A4 = −2.63568E−05, A6 = 2.55286E−07,
A8 = −1.09447E−09, A10 = 2.00712E−12
second surface K = 0.00000, A4 = −2.45760E−05, A6 = 2.44278E−07,
A8 = −1.08316E−09, A10 = 2.06200E−12
eighth surface K = 0.00000, A4 = −4.41017E−05, A6 = 2.69185E−06,
A8 = 6.55923E−08, A10 = −4.05098E−10
ninth surface K = 0.00000, A4 = 5.27515E−05, A6 = 3.05078E−06,
A8 = 5.19776E−08, A10 = 1.35049E−10

Various Data

| | |
|---|---|
| focal length (f) | 38.838 (mm) |
| F-number (Fno) | 2.920 |
| half angle of view (w/2) | 15.561 (mm) |
| image height (maximum) (y max) | 10.815 (mm) |

| β | infinite distance | −0.5 time | −1.0 time |
|---|---|---|---|
| d0 | ∞ | −92.565 | −69.393 (mm) |
| d2 | 38.073 | 21.989 | 5.768 (mm) |
| d9 | 6.131 | 22.215 | 38.437 (mm) |
| total length (TL) of lens system | 84.999 | 84.999 | 84.999 (mm) |
| back focus (Bf) | 1.000 | 1.000 | 1.000 (mm) |
| effective F-number | — | 4.290 | 5.700 |

Data of each lens group

| Group number | first surface | focal length (mm) |
|---|---|---|
| 1 | 1 | −3743.052 |
| 2 | 3 | 36.122 |
| 3 | 10 | 2507.591 |

In Examples 1 through 5, the total length (TL) of the lens system in each of the construction data is a total length of the lens system at an infinite object (a distance from the object-side surface of the first lens element to the imaging surface), and β indicates an image formation magnification. Since the macro lenses as Examples 1 through 5 can photograph an image up to the same size, a state of β=−1.0 corresponds to a state that a closest distance object is focused, and a state of β=−0.5 corresponds to an intermediate state between a state that an infinite object is focused and a state that a closest distance object is focused.

In the aforementioned surface data, the lens surface No. corresponds to the number "i" in the symbol "ri" (i=1, 2, 3, . . . ) attached to each of the lens surfaces shown in FIGS. 8A and 12C. The surface attached with the asterisk "*" to the number "i" indicates an aspherical surface (a dioptric surface having an aspherical configuration, or a surface having a refractive function substantially equivalent to an aspherical surface).

Further, "r" denotes a curvature radius (unit: mm) of each surface, "d" denotes a lens surface interval on an optical axis (on-axis surface interval) in an infinity in-focus state (a focus state at an infinite distance), "nd" denotes a refractive index of each lens element for a d-line (wavelength: 587.56 nm), and "vd" denotes an Abbe number. d0 denotes an optical axis interval (on-axis surface interval) from the first surface to the object plane. Since the surface of the optical diaphragm ST, both surfaces of the flat plate FT, and the light receiving surface of the imaging element SR are flat surfaces, curvature radii of these surfaces are ∞ (infinite).

The aforementioned aspherical surface data shows the values of a second-order curved surface parameter (conical coefficient K) and of an aspherical coefficient Ai (i=4, 6, 8, 10, 12, 14, 16) of each surface defined as an aspherical surface (the surface attached with the asterisk "*" to the number "i" in the surface data).

In each of Examples 1 through 5, the aspherical configuration is defined by the following conditional expression, where a surface vertex is represented as the point of origin, X axis represents an optical axis direction, and h denotes the height in a vertical direction with respect to the optical axis.

$$X=(h^2/R)/[1+(1-(1+K)h^2/R^2)^{1/2}]+\Sigma A_i \cdot h^i$$

where $A_i$ is the i-th-order aspherical coefficient, R is a reference curvature radius, and K is a conical constant.

Regarding paraxial curvature radii (r) described in the claims, the basic idea, and Examples 1 through 5, in actual lens measurement, it is possible to regard an approximate curvature radius obtained by processing a shape measurement value of a vicinity of the lens center (more specifically, a shape measurement value of a center area corresponding to 10% or less with respect to the lens outer diameter) with use of a least square algorithm, as a paraxial curvature radius. Further, in the case where a second-order aspherical coefficient is employed, it is possible to regard a curvature radius, taking into consideration of a second-order aspherical coefficient on the basis of a reference curvature radius described in a definition expression defining an aspherical surface, as a paraxial curvature radius.

In the aforementioned aspherical surface data, the symbol "En" means ten to the power of n. For instance, "E+001" means ten to the power of +1, and "E−003" means ten to the power of −3.

The respective aberrations of the macro lenses 1A through 1E as Examples 1 through 5 having the aforementioned lens arrangements and constructions are respectively shown in FIGS. 13A through 33C.

FIGS. 13A through 17C are aberration diagrams of the macro lens as Example 1. FIGS. 18A through 22C are aberration diagrams of the macro lens as Example 2. FIGS. 23A through 23I are aberration diagrams of the macro lens as Example 3. FIGS. 24A through 28C are aberration diagrams of the macro lens as Example 4. FIGS. 29A through 33C are aberration diagrams of the macro lens as Example 5. FIGS. 13A through 13I, FIG. 18A through 18I, FIGS. 23A through 23I, FIGS. 24A through 24I, and FIGS. 29A through 29I are longitudinal aberration diagrams; and FIG. 14A through 17C, FIGS. 19A through 22C, FIGS. 25A through 28C, and FIGS. 30A through 33C are lateral aberration diagrams. In the longitudinal aberration diagrams of FIGS. 13A through 13I, FIG. 18A through 18I, FIGS. 23A through 23I, FIGS. 24A through 24I, and FIGS. 29A through 29I, FIGS. 13A through 13C, 18A through 18O, 23A through 23C, 24A through 24C, 29A through 29C show a case, in which an infinite object is focused; FIGS. 13D through 13F, 18D through 18F, 23D through 23F, 24D through 24F, 29D through 29F show a case, in which β=−0.5 time; and FIGS. 13G through 13I, 18G through 18I, 23G through 23I, 24G through 24I, 29G through 29I show a case, in which β=−1.0 time. Further, FIGS. 13A, 13D, 13G, 18A, 18D, 18G, 23A, 23D, 23G, 24A, 24D, 24G, 29A, 29D, and 29G show longitudinal spherical aberrations (sine condition); FIGS. 13B, 13E, 13H, 18B, 18E, 18H, 23B, 23E, 23H, 24B, 24E, 24H, 29B, 29E, and 29H show astigmatism field curves; and FIGS. 13C, 13F, 13I, 18C, 18F, 18I, 23C, 23F, 23I, 24C, 24F, 24I, 29C, 29F, and 29I show distortions. A horizontal axis of spherical aberration represents a focus position deviation in mm, and a vertical axis thereof represents a normalized value at a maximum incident height. A horizontal axis of astigmatism field curves represents a focus position deviation in mm, and a vertical axis thereof represents an image height in mm. A horizontal axis of distortion represents a ratio (%) of an actual image height to an ideal image height, and a vertical axis thereof represents an image height in mm. In graphs of spherical aberration, the solid line indicates results on a d-line (wavelength: 587.56 nm), the one-dotted chain line indicates results on a g-line (wavelength: 435.84 nm), the two-dotted chain line indicates results on a C-line (wavelength: 656.28 nm), and the broken line indicates results on an unsatisfactory amount (unit: mm) in sine condition for the d-line, respectively. In graphs of astigmatism field curves, the broken line and the solid line respectively indicate results on a tangential (meridional) surface (DM) and a sagittal (radial) surface (DS). The graphs of astigmatism field curves and distortion show results in the case of using the d-line (wavelength: 587.56 nm).

FIGS. 14A and 14B, 19A and 19B, 25A and 25B, and 30A and 30B are lateral aberration diagrams in the case where an infinite object is focused. FIGS. 15A through 15C, 20A through 20C, 26A through 26C, and 31A through 31C are lateral aberration diagrams in the case where an infinite object is focused, and an error by camera shake is corrected by 0.3 degree as shake correction. FIGS. 16A and 16B, 21A and 21B, 27A and 27B, and 32A and 32B are lateral aberration diagrams, in the case where β=−1.0 time. FIGS. 17A through 17C, 22A through 22C, 28A through 28C, and 33A through 33C are lateral aberration diagrams, in the case where β=−1.0 time and an error by camera shake is corrected by 0.3 degree as shake correction. In the drawings of FIGS. 14A and 14B, 16A and 16B, 19A and 19B, 21A and 21B, 25A and 25B, 27A and 27B, 30A and 30B, and 32A and 32B, FIGS. 14A, 16A, 19A, 21A, 25A, 27A, 30A, and 32A indicate a case, in which the image height y'=7.6; and FIGS. 14B, 16B, 19B, 21B, 25B, 27B, 30B, and 32B indicate a case, in which the image height y'=0. In the drawings of FIGS. 15A through 15C, 17A through 17C, 20A through 20C, 22A through 22C, 26A through 26C, 28A through 28C, 31A through 31C, and 33A through 33C, FIGS. 15A, 17A, 20A, 22A, 26A, 28A, 31A, and 33A indicate a case, in which the image height y'=7.6; FIGS. 15B, 17B, 20B, 22B, 26B, 28B, 31B, and 33B indicate a case, in which the image height y'=0; and FIGS. 15C, 17C, 20C, 22C, 26C, 28C, 31C, and 33C indicate a case, in which the image height y'=−7.6.

Table 1 shows values of the parameters of each of the macro lenses 1A through 1E as Examples 1 through 5. Table 2 shows values, in the case where the conditional expressions (1) through (3) and (7) through (10) are applied to the values of the respective parameters.

TABLE 1

|  | Ex 1 | Ex 2 | Ex 3 | Ex 4 | Ex 5 |
|---|---|---|---|---|---|
| M2 | 30.149 | 30.020 | 28.565 | 30.098 | 32.306 |
| f1 | 1966.643 | 408.103 | 445.504 | 10229.472 | −3743.052 |
| f2 | 36.574 | 41.550 | 38.649 | 35.304 | 36.122 |
| f3 | −97.449 | −96.428 | −110.136 | −8580.279 | 2507.591 |
| e0 | 1.033 | 1.972 | 1.379 | 1.336 | 1.603 |
| Yinf | −9.107 | −8.612 | −8.506 | −9.806 | −10.758 |
| Ynear | −1.009 | −1.093 | −1.028 | −0.761 | −0.985 |
| Cs1(Yinf) | 0.034 | 0.019 | 0.022 | −0.035 | −0.027 |
| Cs1(Ynear) | 0.034 | 0.019 | 0.022 | −0.038 | −0.031 |
| Cs2(Yinf) | 0.031 | 0.014 | 0.018 | −0.034 | −0.026 |
| Cs2(Ynear) | 0.031 | 0.014 | 0.018 | −0.038 | −0.030 |
| e(Yinf) | 0.876 | 1.777 | 1.239 | 1.371 | 1.662 |
| e(Ynear) | 1.031 | 1.969 | 1.377 | 1.336 | 1.603 |
| Φinf | −2.486E−05 | 1.037E−04 | −5.453E−04 | 8.488E−05 | −2.899E−04 |
| Φnear | 1.852E−05 | 1.152E−04 | −5.295E−04 | 9.632E−05 | −2.701E−04 |
| r1 | 29.030 | 52.240 | 44.901 | −26.216 | −32.689 |
| r2 | 32.351 | 71.671 | 54.106 | −26.742 | −34.084 |
| βv | 3.0399 | 3.0950 | — | 3.2198 | 3.1447 |

TABLE 2

|  | Conditional expression | Ex 1 | Ex 2 | Ex 3 | Ex 4 | Ex 5 |
|---|---|---|---|---|---|---|
| 1 | M2/f2 | 0.824 | 0.722 | 0.739 | 0.853 | 0.894 |
| 2 | (Φinf − Φnear) * f2 | −0.0016 | −0.0005 | −0.0006 | −0.0004 | −0.0007 |
| 3 | e0/f2 | 0.028 | 0.047 | 0.036 | 0.038 | 0.044 |
| 7 | f2/f1 | 0.019 | 0.102 | 0.087 | 0.003 | −0.010 |
| 8 | |(r1 + r2)/(r1 − r2)| | 18.483 | 6.377 | 10.756 | 100.681 | 47.866 |
| 9 | f2/f3 | −0.375 | −0.431 | −0.351 | −0.004 | 0.014 |
| 10 | βv | 3.0399 | 3.0950 | — | 3.2198 | 3.1447 |

As described above, the macro lenses 1A through 1E as Examples 1 through 5 advantageously increases the moving speed of a lens group to be moved in focusing and reduces the weight of the lens group, while suppressing aberration variation in the range from an infinite distance to a closest distance. Further, an imaging apparatus incorporated with one of the macro lenses 1A through 1E as Examples 1 through 5 enables to implement high-speed focusing while suppressing noise, and to form an optical image, in which various aberrations are advantageously corrected in the range from an infinite distance to a closest distance, on the light receiving surface of the imaging element.

The specification discloses the aforementioned arrangements. The following is a summary of the primary arrangements of the embodiment.

A macro lens according to an aspect includes, in the order from an object side to an image side, a first lens group, a second lens group having a positive refractive power as a whole, and a third lens group. The first lens group includes a plane S1 and a plane S2 having curvature radii of a same sign and defined by the conditional expressions (1) through (3). In the macro lens, focusing is performed by fixing the first lens group and the third lens group, and by moving the second lens group on the optical axis in focusing from an infinite object to a close distance object.

The thus-configured macro lens satisfies the conditional expressions (1) through (3); and in focusing, the first and third lens groups are fixed with respect to the image plane, and the second lens group is largely moved toward the object side. In the macro lens having the above configuration, it is possible to greatly change the height of an off-axis light ray in the first lens group in the range from an infinite distance to a closest distance. The second lens group is largely moved toward the object side in focusing. As a result, astigmatism in the second lens group may greatly change. However, as described above, since the height of an off-axis light ray in the first lens group is greatly changed in focusing, it is possible to cancel out the astigmatism that may be greatly changed in the second lens group by the first lens group. Thus, the macro lens, in which a lens group to be moved in focusing is only one among the plural lens groups, is advantageous in increasing the moving speed of the lens group and reducing the weight of the lens group, while suppressing aberration variation in the range from an infinite distance to a closest distance.

Further, the macro lens having the above configuration may satisfy the conditional expression (7).

In the thus-configured macro lens, exceeding the upper limit of the conditional expression (7) increases a variation in the incident angle of an off-axis light ray incident to the second lens group, depending on the position of the second lens group. As a result, a variation in astigmatism or coma aberration in the second lens group increases in the course of focusing, which is not preferable. On the other hand, falling below the lower limit of the conditional expression (7) decreases a variation in the incident angle of an off-axis light ray in the second lens group in the course of focusing. However, the height of an on-axis light ray incident to the second lens group is increased. This makes it difficult to correct spherical aberration and coma aberration in the second lens group, which is not preferable.

Further, in the macro lens having the above configurations, the first lens group may include at least one positive lens element and at least one negative lens element.

In the thus-configured macro lens, since the first lens group includes at least one positive lens element and at least one negative lens element, it is possible to obtain a degree of freedom in disposing the plane S1 and the plane S2 satisfying the conditional expression (2) and the conditional expression (3), while suppressing the optical power of the first lens group in such a manner as to satisfy the conditional expression (7).

Further, in the macro lens having the above configurations, the S1 plane may be an object-side plane in a space disposed between the positive lens element and the negative lens element, the S2 plane may be an image-side plane in the space; and the macro lens may satisfy the conditional expression (8).

In the thus-configured macro lens, a so-called air lens element is defined by the object-side plane in the space disposed between the positive lens element and the negative lens element i.e. the S1 plane, and the image-side plane in the space i.e. the S2 plane; and the macro lens satisfies the conditional expression (8). This enables to suppress spherical aberration and coma aberration, while satisfying the conditional expression (2). Specifically, falling below the lower limit of the conditional expression (8) excessively increases a curvature difference between the plane S1 and the plane S2, and increases spherical aberration or coma aberration on the plane S1 and on the plane S2, which is not preferable.

Further, in the macro lens having the above configurations, the first lens group may include at least one aspherical surface, and the aspherical surface may correspond to one of the S1 plane and the S2 plane.

In the thus-configured macro lens, the first lens group includes at least one aspherical surface, and the aspherical surface corresponds to one of the S1 plane and the S2 plane. This enables to satisfy the conditional expression (2) while suppressing spherical aberration and coma aberration.

Further, the macro lens having the above configurations may satisfy the conditional expression (9).

In the thus-configured macro lens, exceeding the upper limit of the conditional expression (9) excessively increases the positive optical power of the third lens group, and makes it difficult to obtain sufficient back focus, which is not preferable. On the other hand, falling below the lower limit of the conditional expression (9) excessively increases the negative optical power of the third lens group, which may increase the height of an on-axis light ray in the second lens group. As a result, it is difficult to correct spherical aberration and coma aberration in the second lens group, which is not preferable.

Further, in the macro lens having the above configurations, the third lens group may include at least one positive lens element and at least one negative lens element.

In the thus-configured macro lens, the third lens group, in which the height of an off-axis light ray tends to increase, includes at least one positive lens element and at least one negative lens element. This is advantageous in correcting astigmatism and coma aberration.

In the macro lens having the above configurations, the second lens group may include at least one aspherical surface.

In the thus-configured macro lens, convergence power necessary for the entire optical system is mainly given by the second lens group. Accordingly, it is important to suppress aberrations in the second lens group. In view of the above, it is required to increase the degree of freedom for aberration correction in the second lens group. Increasing the number of lens elements in an attempt to increase the degree of freedom may increase the weight of a lens group, which is not preferable for the second lens group to be moved in focusing. The macro lens, in which the second lens group has at least one aspherical surface, is advantageous in correcting aberrations as required, while suppressing an increase in the number of lens elements.

Further, in the macro lens having the above configurations, vibration control may be performed by moving a part of lens elements of the third lens group in a direction perpendicular to the optical axis, the part of the lens elements of the third lens group serving as a vibration control lens group.

The position of the third lens group is fixed with respect to the image plane. Accordingly, the magnification of the third lens group does not change in focusing. Accordingly, in the thus-configured macro lens, the vibration control sensitivity of a lens group for use in vibration control in the third lens group is set to a constant value in the whole range of focusing from an infinite distance to a closest distance. Thus, the vibration control is simplified.

Further, in the macro lens having the above configurations, the vibration control lens group to be moved for the vibration control may be a lens group disposed on the object side than a positive lens element disposed at a position closest to the image side in the third lens group, and the macro lens may satisfy the conditional expression (10).

In the thus-configured macro lens, the positive lens element disposed at the position closest to the image side is fixed in the vibration control, and a lens group disposed on the object side than the aforementioned positive lens element is used as the vibration control lens group. In the thus-configured macro lens, the inside of a lens barrel is sealably closed by the aforementioned positive lens element. This is advantageous in preventing intrusion of dust or moisture. Further, the macro lens satisfying the conditional expression (10) is advantageous in obtaining appropriate vibration control sensitivity. Specifically, falling below the lower limit of the conditional expression (10) weakens the vibration control sensitivity, increases the required moving amount of the vibration control lens group, and requires driving means having a large output for driving the vibration control lens group, which is not preferable. On the other hand, exceeding the upper limit of the conditional expression (10) excessively increases the vibration control sensitivity, and requires position detecting means having a high measurement precision for detecting the position of the vibration control lens group, which is not preferable.

Further, in the macro lens having the above configurations, the first lens group may have a positive refractive power as a whole, and the third lens group may have a negative refractive power as a whole. This provides a macro lens having three lens groups of positive, positive, and negative refractive powers.

Further, in the macro lens having the above configurations, the first lens group may have a negative refractive power as a whole, and the third lens group may have a positive refractive power as a whole. This provides a macro lens having three lens groups of negative, positive, and positive refractive powers.

Further, an imaging apparatus according to another aspect is provided with the macro lens having one of the above configurations, and an imaging element which converts an optical image into an electrical signal, wherein the macro lens is configured to form an optical image of an object on a light receiving surface of the imaging element.

The above configuration provides an imaging apparatus incorporated with a macro lens which is capable of advantageously increasing the moving speed of a lens group to be moved in focusing, and reducing the weight of the lens group, while suppressing aberration variation in the range from an infinite distance to a closest distance. Accordingly, the thus-configured imaging apparatus enables to implement high-speed focusing while suppressing noise, and to form an optical image, in which various aberrations are advantageously corrected in the range from an infinite distance to a closest distance, on the light receiving surface of the imaging element.

This application is based on Japanese Patent Application No. 2012-90647 filed on Apr. 12, 2012, and Japanese Patent Application No. 2013-13669 filed on Jan. 28, 2013, the contents of which are hereby incorporated by reference.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:
1. A macro lens comprising, in the order from an object side to an image side:
a first lens group;
a second lens group having a positive refractive power as a whole; and
a third lens group, wherein
the first lens group includes a plane S1 and a plane S2 having curvature radii of a same sign and defined by the following conditional expressions (1) through (3), and
focusing is performed by fixing the first lens group and the third lens group, and by moving the second lens group on an optical axis in focusing from an infinite object to a close distance object,

$$0.6 < M2/f2 < 1 \tag{1}$$

$$(\phi\text{inf} - \phi\text{near})/f2 < -0.0002 \tag{2}$$

$$e0/f2 < 0.15 \tag{3}$$

where
M2: a moving amount of the second lens group from an infinite distance to a closest distance,
f2: a focal length of the second lens group,
e0: an air equivalent distance between the plane S1 and the plane S2 on the optical axis,
$\phi$inf: a combined optical power of the plane S1 and the plane S2 in a direction parallel to the optical axis, and an optical power to be defined by the following conditional expression (4A), assuming that Yinf is a height of a light ray of a light flux from the optical axis, the light ray passing a center of an aperture stop and intersecting the plane S1, the light flux forming an image having a maximum image height at a time of forming an infinite object, $$\phi\text{inf} = (\phi 1(Y\text{inf}) + \phi 2(Y\text{inf}) - \phi 1(Y\text{inf})\phi 2(Y\text{inf})e(Y\text{inf}))/n3 \tag{4A}$$

assuming that n1 is a refractive index of an object-side medium of the plane S1 for a d-line, n2 is a refractive index of a medium between the plane S1 and the plane S2 for the d-line, n3 is a refractive index of an image-side medium of the plane S2 for the d-line, C1(Y) is a curvature of the plane S1 at a height Y, C2(Y) is a curvature of the plane S2 at the height Y, and e(Y) is an air equivalent distance (air equivalent plane interval) between the plane S1 and the plane S2 in the direction parallel to the optical axis with respect to the height Y,
$\phi 1(Y)$ is an optical power of the plane S1 at the height Y from the optical axis, and is an optical power to be defined by the following conditional expression (5), and
$\phi 2(Y)$ is an optical power of the plane S2 at the height Y from the optical axis, and is an optical power to be defined by the following conditional expression (6), $$\phi 1(Y) = (n2 - n1)C1(Y) \tag{5}$$

$$\phi 2(Y) = (n3 - n2)C2(Y) \tag{6}$$

where
$\phi$near: a combined optical power of the plane S1 and the plane S2 in the direction parallel to the optical axis, and an optical power to be defined by the following conditional expression (4B), assuming that Ynear is a height of a light ray of a light flux from the optical axis, the light ray passing a center of an aperture stop and intersecting the plane S1, the light flux forming an image having a maximum image height at a time of forming a closest distance object, $$\phi\text{near} = (\phi 1(Y\text{near}) + \phi 2(Y\text{near}) - \phi 1(Y\text{near})\phi 2(Y\text{near})e(Y\text{near}))/n3 \tag{4B}$$

2. The macro lens according to claim 1, wherein the macro lens satisfies the following conditional expression (7)

$$-0.1 < f2/f1 < 0.2 \qquad (7)$$

where
f1: a focal length of the first lens group.

3. The macro lens according to claim 1, wherein the first lens group includes at least one positive lens element and at least one negative lens element.

4. The macro lens according to claim 3, wherein the S1 plane is an object-side plane in a space disposed between the positive lens element and the negative lens element,
the S2 plane is an image-side plane in the space, and
the macro lens satisfies the following conditional expression (8)

$$3 < |(r1+r2)/(r1-r2)| \qquad (8)$$

where
r1: a curvature radius of the plane S1, and
r2: a curvature radius of the plane S2.

5. The macro lens according to claim 1, wherein the first lens group includes at least one aspherical surface, and
the aspherical surface corresponds to one of the S1 plane and the S2 plane.

6. The macro lens according to claim 1, wherein the macro lens satisfies the following conditional expression (9)

$$-0.6 < f2/f3 < 0.1 \qquad (9)$$

where
f3: a focal length of the third lens group.

7. The macro lens according to claim 1, wherein the third lens group includes at least one positive lens element and at least one negative lens element.

8. The macro lens according to claim 1, wherein the second lens group includes at least one aspherical surface.

9. The macro lens according to claim 1, wherein vibration control is performed by moving a part of lens elements of the third lens group in a direction perpendicular to the optical axis, the part of the lens elements of the third lens group serving as a vibration control lens group.

10. The macro lens according to claim 9, wherein the vibration control lens group to be moved for the vibration control is a lens group disposed on the object side than a positive lens element disposed at a position closest to the image side in the third lens group, and
the macro lens satisfies the following conditional expression (10)

$$2 < \beta v < 9 \qquad (10)$$

where
βv: a paraxial lateral magnification of the vibration control lens group in focusing an infinite object.

11. The macro lens according to claim 1, wherein the first lens group has a positive refractive power as a whole, and
the third lens group has a negative refractive power as a whole.

12. The macro lens according to claim 1, wherein the first lens group has a negative refractive power as a whole, and
the third lens group has a positive refractive power as a whole.

13. An imaging apparatus, comprising:
the macro lens of claim 1; and
an imaging element which converts an optical image into an electrical signal, wherein
the macro lens is configured to form an optical image of an object on a light receiving surface of the imaging element.

* * * * *